(12) United States Patent
Won et al.

(10) Patent No.: US 12,248,707 B2
(45) Date of Patent: Mar. 11, 2025

(54) METHOD AND DEVICE FOR DETERMINING ORDER GUARANTEE UNIT IN MULTI-INSTRUCTION QUEUE STORAGE

(71) Applicant: Korea Advanced Institute of Science and Technology, Daejeon (KR)

(72) Inventors: Youjip Won, Daejeon (KR); Jieun Kim, Daejeon (KR)

(73) Assignee: Korea Advanced Institute of Science and Technology, Daejeon (KR)

( * ) Notice: Subject to any disclaimer, the term of this patent is extended or adjusted under 35 U.S.C. 154(b) by 0 days.

(21) Appl. No.: 18/255,560

(22) PCT Filed: Nov. 29, 2021

(86) PCT No.: PCT/KR2021/017786
§ 371 (c)(1),
(2) Date: Jun. 1, 2023

(87) PCT Pub. No.: WO2022/114900
PCT Pub. Date: Jun. 2, 2022

(65) Prior Publication Data
US 2024/0094954 A1 Mar. 21, 2024

(30) Foreign Application Priority Data
Nov. 27, 2020 (KR) .................. 10-2020-0162262

(51) Int. Cl.
*G06F 3/06* (2006.01)
(52) U.S. Cl.
CPC .......... *G06F 3/0659* (2013.01); *G06F 3/0607* (2013.01); *G06F 3/064* (2013.01); *G06F 3/0679* (2013.01)

(58) Field of Classification Search
CPC ...... G06F 3/0659; G06F 3/0607; G06F 3/064; G06F 3/0679
See application file for complete search history.

(56) References Cited

U.S. PATENT DOCUMENTS

| | | |
|---|---|---|
| 2014/0006701 A1 | 1/2014 | Condit et al. |
| 2019/0220404 A1* | 7/2019 | Hwang ............... G06F 12/0253 |

(Continued)

FOREIGN PATENT DOCUMENTS

| | | |
|---|---|---|
| KR | 10-2017-0026926 | 3/2017 |
| WO | WO 2016-071743 | 5/2016 |

OTHER PUBLICATIONS

Arpit Joshi et al., 'Efficient Persist Barriers for Multicores', 2015 48th Annual IEEE/ACM International Symposium on Micro architecture (MICRO), pp. 660-671, Dec. 9, 2015.

(Continued)

*Primary Examiner* — Mark A Giardino, Jr.
(74) *Attorney, Agent, or Firm* — Christensen O'Connor Johnson Kindness PLLC

(57) ABSTRACT

Disclosed is a write method comprising a step in which a storage device determines an execution order between received first and second write commands, and executes the first write command and the second write command according to the determined execution order. The first write command comprises first stream identification information having {first stream ID, first epoch ID}, the second write command comprises second stream identification information having {second stream ID, second epoch ID}, and when the first stream ID and the second stream ID are different from each other, the execution order is determined without using the result of comparison between the first epoch ID and the second epoch ID.

13 Claims, 16 Drawing Sheets

(56) References Cited

U.S. PATENT DOCUMENTS

2020/0125518 A1\* 4/2020 Ringe ................ G06F 12/0811
2020/0249989 A1\* 8/2020 Benisty ................ G06F 9/3877
2021/0109914 A1\* 4/2021 Harduf ................ G06F 16/2365

OTHER PUBLICATIONS

Mengjja Yan et al., 'InvisiSpec: Making Speculative Execution Invisible in the Cache Hierarchy', 2018 51st Annual IEEE/ACM International Symposium on Micro architecture (MICRO), pp. 428-441, Jan. 2018.
International Search Report for International Application No. PCT/KR2021/017786 (International Filing Date: Nov. 29, 2021), mailed Mar. 24, 2022 (4 pages).

\* cited by examiner

METHOD AND DEVICE FOR DETERMINING ORDER GUARANTEE UNIT IN MULTI-INSTRUCTION QUEUE STORAGE

TECHNICAL FIELD

The present invention relates to computing technology and, more particularly, to technology for, when a plurality of transmission channels is present between a host and a storage device, guaranteeing execution order between commands transmitted through the transmission channels.

RELATED ART

According to the related art, when transmitting write commands from a host to a storage device, an epoch ID value may be included in each write command. The storage device may determine execution order of each write command according to priority between epoch IDs included in the respective write commands. When the host generates a plurality of threads, priority is absent between write commands of a first group generated by a first thread and write commands of a second group generated by a second thread. However, when the host determines epoch IDs respectively included in the write commands of the first group and the write commands of the second group using only one global variable, that is, only one epoch counter, the storage device may unnecessarily determine execution priority although priority is absent between the write commands of the first group and the write commands of the second group.

Also, in an environment in which a plurality of command transmission channels is provided between the host and the storage device, inefficiency may occur in the process of determining execution priority between write commands.

DETAILED DESCRIPTION

Technical Subject

To solve the aforementioned issues, the present invention provides technology for determining an order guaranteeing unit in a multi-command queue storage.

Solution

<Definition of Stream and New Epoch ID Allocation Algorithm>

FIG. 1 illustrates input/output (I/O) requests that arrive at an NVMe device over time and an epoch ID of each I/O request when two threads simultaneously call fdatasync( ) for different files. Here, A1 and A2 represent write commands of a file A and B1 and B2 represent write commands of a file B. In FIG. 1, among five write commands received by a storage, a first command (A1) and a second command (B1) from the left and a second command (A2) from the right represent write commands of which write order needs to be guaranteed, and a first command (A3) from the right and a third command (B2) from the right represent barrier-write commands.

Unlike fsync( ), the above fdatasync( ) does not perform journaling unless it is an allocating write that changes a size of a file. Therefore, fdatasync( ) dispatches a write request for a data block of the file delivered as an input argument and includes a barrier flag in a write request for a last data block that is dispatched to guarantee order between fdatasync( ) in one thread and transmits the same as a barrier-write. A method in which a plurality of threads operating in a file system shares the same epoch counter and an ID is assigned to an I/O request generated by each thread a corresponding epoch counter has two issues in a multi-thread environment.

A first issue is that unnecessary write order occurs between different processes. In FIG. 1, a first thread (T1) and a second thread (T2) called fdatasync( ) for different files. There is no need to guarantee permanent write order between data blocks (A1, A2, A3) belonging to a first file (A) and data blocks (B1, B2) belonging to a second file (B). Since the first thread (T1) and the second thread (T2) share the same epoch counter, B1 and B2 are assigned with epoch ID '0' and A2 and A3 are assigned with epoch ID '1' in FIG. 1. Therefore, unnecessary write order restrictions occur between the data blocks (B1, B2) and data blocks (A2, A3) belonging to independent epochs.

A second issue is that unnecessary write order needs to be guaranteed within the same thread. Write order may be changed among write requests for the data blocks (A1, A2, A3) generated by the first thread (T1). However, since the first thread (T1) and the second thread (T2) share the same epoch counter, write commands belonging to the same epoch may have different epoch values. In this case, unnecessary write order guarantee may occur between the write commands belonging to the same epoch. In FIG. 1, although write requests of the data blocks (A1, A2, A3) need to belong to the same epoch, an epoch counter increases due to a barrier-write (B2) by fdatasync( ) called by the second thread and A1 has an epoch ID value different from that of A2 and A3. Therefore, unnecessary order guarantee occurs between write requests for the data blocks A1, A2, and A3 belonging to the same epoch.

To solve the aforementioned issues, "stream" is defined herein. The stream refers to a flow of epochs generated in a block I/O layer. Write order for epochs belonging to the same stream needs to be guaranteed in order in which the corresponding epochs are generated. In contrast, there is no need to guarantee write order between epochs belonging to different epochs.

Epochs generated in the same thread belong to the same stream. For the epochs belonging to the same stream, a storage guarantees write order between the epochs.

In the present invention, a stream ID is assigned to each of all write commands. A corresponding stream ID is transmitted together when transmitting a write command to the storage. The stream ID of the write command is assigned from a block I/O layer.

Each thread has its own stream. Therefore, pid (process ID) of a corresponding stream may be used for a stream ID generated by the corresponding thread. In an example embodiment of the present invention, a stream ID may be specified in a portion of an NVMe command structure. Each stream has its own epoch counter.

In an example embodiment of the present invention, an epoch counter is added to a task structure that represents a thread.

Upon thread generation, the epoch counter is initialized to 0. When a write command is generated, an epoch ID of the corresponding write command is assigned with an epoch counter value present in a current kernel. Every time a barrier-write is generated, the thread increases the epoch counter by 1. An epoch ID of the barrier-write is assigned with a value before increasing the epoch counter by 1. The barrier-write refers to a write request located at the end of an epoch and has the same epoch ID value as write requests belonging to the same epoch.

An order-preserving write request generated after the barrier-write belongs to a new epoch. The corresponding write request receives an epoch counter value that increased by 1 as an epoch ID when a barrier-write request of a previous epoch is generated. Consecutive epochs have consecutive epoch IDs.

FIG. 2 illustrates I/O arriving at a storage device over time when a stream ID allocation algorithm and an epoch ID allocation algorithm provided according to an aspect of the present invention are applied. A stream ID and an epoch ID of I/O request are displayed together.

Since write requests for data blocks (A1, A2, A3) and write requests for data blocks (B1, B2) have different stream IDs, it can be seen that unnecessary permanent order restrictions between the data blocks (B1, B2) and the data blocks (A2, A3) are absent. Also, it can be seen that an epoch ID is independently allocated in a first thread (T1) and a second thread (T2).

<Double Stream Write>

In general, there is no need to guarantee order between writes belonging to different streams. However, developed is technology for supporting this in a case in which there is a need to guarantee order between two streams due to design characteristics of a file system. To this end, developed herein is a method of guaranteeing order between writes belonging to two streams. This is called a double stream write. The double stream write has two stream IDs and two epoch IDs. That is, the double stream write has {first stream ID, first epoch ID} that is a pair of stream ID and epoch ID for a first stream and {second stream ID, second epoch ID} that is a pair of stream ID and epoch ID for a second stream.

For example, the following situation may be assumed. First, two streams S1 and S2 are present. Second, S1 includes writes of w11, w12, and w13. Third, S2 includes writes of w21, w22, and w23. Fourth, order between writes belonging to each stream needs to be guaranteed. That is, write order of w11→w12, w12→w13 needs to be guaranteed for S1, and similarly, write order of w21→w22, w22→w23 needs to be guaranteed for S2. Fifth, in this situation, there is a case in which it is necessary to guarantee write order of w13→w22. That is, write order between the write w13 of the first stream and the write w22 of the second stream needs to be guaranteed. That is, the write w22 needs to be completed after the write w13 is completed.

To guarantee order between write commands belonging to different streams, proposed is the concept of "double stream write."

The double stream write is a special form of "write." A normal "write" has its own stream ID and epoch ID. The double stream write belongs to two streams at the same time. Therefore, the double stream write has two stream IDs and two epoch IDs.

The double stream write needs to guarantee "write" order in all of the two streams to which the double stream write belongs.

The double stream write is used when one thread needs to wait for a write from another thread before proceeding. Journaling of EXT4 is an example. In the case of calling fsync in a sequential journaling mode of an EXT4 file system, order between write commands belonging to different two streams may need to be guaranteed. In this case, the corresponding write order may be guaranteed with the double stream write. When the EXT4 file system calls fsync( ), an application thread records a modified page (dirty page) of a file in a write buffer of a disk and wakes up a journaling thread. EXT4 separately allocates a thread, that is, a journaling thread that records modified metadata. The journaling thread records the modified metadata and journal commit blocks in a journal area of the disk. The journal commit block needs to be recorded in the disk after all the modified pages (dirty pages) and modified metadata are recorded in the disk. After writing of the modified file block and writing of the modified metadata are completed, writing of the commit block needs to be terminated.

Writing of a modified file block, writing of modified metadata, and writing of a commit block may be assumed as W(D), W(M), and W(C), respectively. Here, order of W(D)→W(C) and W(M)→W(C) needs to be guaranteed. The journaling thread is in charge of writing the modified metadata and the commit block. Therefore, since two writes are generated in the same thread and belong to the same stream, the order of W(M)→W(C) may be guaranteed using an epoch ID and a stream ID. However, guaranteeing the order of W(D)→W(C) is a different situation. When the EXT4 file system calls fsync( ), W(D) is generate by the application thread and W(C) is generated by the journaling thread. The two writes are generated by two different threads, respectively, and have different stream IDs. Since different streams generate the respective write requests, there is an issue that there is no way to force write order between them.

The aforementioned issue may be solved with the double stream write proposed in the present invention.

In the case of calling fsync( ) in the EXT4 file system, there may be order restrictions of {W(D), W(M)}→{W(C)}. Since {W(M)}→{W(C)} belong to the same journaling thread stream, the order may be guaranteed with a stream ID and an epoch ID of the journaling thread. The order restrictions of {W(D)}→{W(C)} may be guaranteed by setting W(D) to the double stream write. In the case of calling fsync( ) in the EXT4 file system, the present invention sets a dirty page write request (hereinafter, W(D)) generated by the application thread as the double stream write that belongs to a stream of the application thread and also belongs to the journaling thread stream. The double stream write has two stream IDs (hereinafter, first stream ID and second stream ID) and two epoch IDs (hereinafter, first epoch ID, second epoch ID). In an example embodiment of the present invention, in the case of calling fsync, the file system assigns a stream ID of the application thread as a first stream ID and assigns an epoch counter value of the application thread as a first epoch ID when generating bio for a dirty page. Also, in an example embodiment of the present invention, the file system assigns a stream ID of a currently operating journal thread to a corresponding dirty page as a second stream ID and assigns an epoch counter value of the journal thread as a second epoch ID. The file system may specify order information within an application thread stream that generates W(D) through the first stream ID and the first epoch ID of W(D). At the same time, the file system may specify order information ({W(D), W(M)}→{W(C)}) within the journaling thread stream of W(D) through the second stream ID and the second epoch ID of W(D).

In an example embodiment of the present invention, a first stream ID, a second stream ID, a first epoch ID, and a second epoch ID of write may be specified in a portion of a command structure that is delivered to a storage.

FIG. 3 illustrates an example of calling, by an application thread (T1), fsync( ) for a file A in an EXT4 sequential journaling mode. FIG. 3 illustrates a first stream ID and a second stream ID and a first epoch ID and a second epoch ID included in a write command arriving at a storage in temporal order. If the application thread (T1) calls fsync( ), the application thread generates and dispatches a dirty page write (W(D)). The file system assigns process ID '2062' of the application thread to the first stream ID of W(D) and assigns epoch counter value '51' of the application thread to the first epoch ID. Also, since W(D) is a dirty page write request that is generated due to fsync( ) call, the file system assigns process ID '1995' of the currently operating journal thread to the second stream ID of W(D) and assigns epoch counter value '10' of the journal thread to the second epoch ID. If the application thread dispatches W(D) and then wakes up the journaling thread (JBD), the journaling thread configures a journal metadata block (W(M)) as a write. The journal metadata block needs to be recorded in a disk before a journal commit block to be generated later and is configured as a barrier-write. The file system assigns stream ID '1995' and epoch counter value '10' of the journal thread to W(M) as the first stream ID and the first epoch ID, respectively. Since W(M) is a single stream write, the second stream ID and the second epoch ID are not assigned and a value is 0. The journaling thread configures the journal commit block (W(C)) as a write and dispatches the same. Since an epoch counter value of the journaling thread increases by '1' due to W(M), the first epoch ID of W(C) has a value '11' greater by '1' than W(M). The order restrictions {W(M)}→{W(C)} may guarantee the order through a first stream ID and a first epoch ID of each write. The order restrictions {W(D), W(M)}→{W(C)} may guarantee order through the second stream ID and the second epoch ID of W(D) and the first stream IDs and the first epoch IDs of W(M) and W(C). Since the second epoch ID of W(D) is assigned with the same value as that of the first epoch ID of W(M) at all times, the order restrictions are absent between W(D) and W(M). On the contrary, since the second epoch ID of the W(D) and the first epoch ID of W(M) are assigned with a value smaller by 1 than that of the first epoch ID of W(C), order of {W(D), W(M)}→{W(C)} is guaranteed.

In an example embodiment of the present invention, although a journal commit occurs due to fsync( ) call of the application thread in a situation in which modifications of multiple files are configured as a compound transaction, write order may be guaranteed with a double stream write.

FIG. 4 illustrates an example of calling, by a first thread (T1) and a second thread (T2), fsync( ) for a file A and a file B, respectively, when metadata modifications of the file A and the file B are configured with the same transaction. In FIG. 4, a situation in which the first thread (T1) calls fsync( ) for the file A before the second thread (T2) is assumed. A dirty page write request (A1) of the file A generated by the first thread is configured with a double stream write and is dispatched. The first thread wakes up a journal thread. In a sequential journaling mode of an EXT4 file system, the journaling thread configures a dirty page of a file included in a compound transaction as a write request and dispatches the same before performing a write on a journal transaction. Since metadata of the file B is included in a transaction, a JBD thread configures a dirty page (B1) of the file B as a write request. A dirty page write request (B1) of the file B is generated by the journal thread and thus, is a single write that belongs to the journal thread rather than the double stream write. The journal thread dispatches the corresponding write request and then configures the journal transaction as a write request and then dispatches the same. Since the dirty page (B1) of the file B is configured as the write request and dispatched by the journal thread, the second thread that calls fsync( ) for the file B does not generate the write request. Dirty page write requests of files included in the compound transaction are all single writes that belong to a stream of the journal thread. Only a dirty page write request generated by a calling thread is configured with the double stream write having order restrictions with the journal thread.

In EXT4 journaling, restrictions of write order between two or more double streams may occur at the same time. A case in which two threads simultaneously call fsync( ) will be described as an example. If fsync( ) is called, a modified file (D), modified metadata (M), and a journal commit block (C) need to be stored in order. Writes generated by the first thread are referred to as W(D1), W(M), and W(C). Writes generated by the second thread through fsync call are referred to as W(D2), W(M), and W(C). It may be assumed that the first thread and the second thread call fsync( ) almost at the same time. Here, the following scenario may be considered. After the first thread (T1) dispatches W(D1), context is switched to the second thread (T2). The second thread (T2) dispatches a W(D2) command and then wakes up the JBD thread. The awakened JBD thread belongs to two threads, that is, the second thread (T2) and the JBD thread. The JBD thread sequentially executes write commands for modified metadata and the commit block. In this case, an order guaranteeing condition of {W(D2), W(M)}→W(C) is generated. However, W(D1) that is generated by the first thread may be an independent write and may be processed after processing of W(C). The order guaranteeing condition does not hold. A most primitive method to solve the issue is the introduction of a 'multi' write. It is to allow one write to redundantly belong to three or more streams. However, it is not easy to implement this technique in practice. Since a command structure delivered to the storage has a limited size of an area, the number of streams recordable in the limited area is also limited. For example, a command structure of NVMe standard has 16 bytes of free space currently unused. This free space may be used to store a stream ID and an epoch ID.

FIG. 5 illustrates an example of the above. FIG. 5 illustrates a situation in which a multi-write occurs by simultaneously calling, by a first thread (T1) and a second thread (T2), fsync( ). The first thread generates and dispatches a dirty page write request (W(D1)). The file system configures W(D1) with a double stream write that belongs to all of T1 (process ID '2062') and a journaling thread (process ID '1995'). In response to occurrence of context switching, the second thread configures a dirty page for file B as a write request (W(D2)) and dispatches the same. The file system configures W(D2) with a double stream write that belongs to all of T2 (process ID '2063') and the journaling thread (process ID '1995'). Then, the thread T2 wakes up the journaling thread such that the journaling thread configures a journal metadata block (W(M)) and a journal commit block (W(C)) as a write and dispatches the same. All of W(M) and W(C) generated by the journaling thread belong to only a journaling thread stream. By representing writes of all files generated by an application thread in response to fsync( ) call as a double write that belongs to the application thread and the journal thread, order of {W(D1), W(D2), W(M)}→{W(C)} may be guaranteed.

Herein, the double stream write or the double write may represent a case in which two thread IDs are included in one write request and a single stream write or a single write may represent a case in which only one thread ID is included in one write request.

According to an aspect of the present invention, there may be provided a write method including determining, by a storage device, execution order between a first write command 701 and a second write command 702 received, and executing the first write command and the second write command according to the determined execution order.

Here, the first write command includes 1sth stream identification information 711 having {first stream ID, first epoch ID}, Here, when the second write command includes stream identification information 722 having (second stream ID, second epoch ID), the storage device may be configured to determine the execution order according to a rule of not using a result of comparing values of the first epoch ID and the second epoch ID.

Here, when the second write command includes stream identification information 713 having {first stream ID, third epoch ID}, the storage device may be configured to determine the execution order according to a rule of comparing values of the first epoch ID and the third epoch ID.

Here, the first write command may further include 24-th stream identification information 724 having {second stream ID, fourth epoch ID}. When the second write command includes 15-th stream identification information 715 having {first stream ID, fifth epoch ID} and when the fifth epoch ID has higher priority than the first epoch ID, the storage device may be configured to execute the first write command after the second write command.

Here, the first write command may further include 24-th stream identification information 724 having {second stream ID, fourth epoch ID}. When the second write command includes 15-th stream identification information 715 having {first stream ID, fifth epoch ID}, and when the fifth epoch ID has lower priority than the first epoch ID, the storage device may be configured to execute the first write command before the second write command.

Here, when the second write command includes 22-nd stream identification information 722 having {second stream ID, second epoch ID}, the 11-th stream identification information and the second stream identification information may be generated by different threads generated by a host that transmits the first write command and the second write command to the storage device.

Here, when the second write command includes stream identification information 722 having {second stream ID, second epoch ID}, the first epoch ID and the second epoch ID may be respectively generated by different variables used by different threads generated by a host that transmits the first write command and the second write command to the storage device.

Here, when the second write command includes 22-nd stream identification information 722 having {second stream ID, second epoch ID}, the write method may further include, prior to the executing, generating, by the host, a first thread having the first stream ID and a second thread having the second stream ID; generating, by the first thread, a first write request having the first stream ID and the first epoch ID and delivering the same to a block layer of the host; generating, by the second thread, a second write request having the second stream ID and the second epoch ID and delivering the same to the block layer of the host; and generating, by the block layer, the first write command or the second write command based on the first write request and the second write request and transmitting the same to the storage device. Here, a variable (=first epoch counter) used by the first thread to generate the first epoch ID and a variable (=second epoch counter) used by the second thread to generate the second epoch ID may differ from each other.

Here, a host that transmits the first write command to the storage device and the storage device may be connected through a plurality of transmission channels. Each of the first write command and the second write command may be transmitted through a different transmission channel among the plurality of transmission channels or may be transmitted through the same one transmission channel.

Here, a host that transmits the first write command to the storage device and the storage device may be connected through a plurality of transmission channels. All write commands having specific {stream ID, epoch ID} may be transmitted through only one transmission channel among the plurality of transmission channels.

Here, a host that transmits a write command to the storage device and the storage device may be connected through a plurality of transmission channels. Here, when the storage device receives a sixth write command 706 having {first stream ID, seventh epoch ID} through a specific transmission channel, the storage device may be configured to execute the sixth write command only when a write command 703, 704, or 705 having {first stream ID, sixth epoch ID} is not received through another transmission channel between a first point in time at which the sixth write command 706 is received and a second point in time that is a time before a predetermined timeout time. The sixth epoch ID may have a higher write priority value than the seventh epoch ID.

Here, a host that transmits a write command to the storage device and the storage device may be connected through a plurality of transmission channels. The storage device may include a timeout controller configured to execute a time count using a timer. The write method may include, in response to receiving a write command having {first stream ID, sixth epoch ID} through a first transmission channel 31, running, by the storage device, the timer by resetting a time count of the timer to a predetermined value; and, in response to receiving the sixth write command 706 having {first stream ID, seventh epoch ID} through a second transmission channel 32, executing, by the storage device the sixth write command only when it is verified that the time count reaches the reference value.

Here, in response to receiving another write command having {first stream ID, sixth epoch ID} through the first transmission channel 31 after running the timer, the storage device may be configured to rerun the timer by resetting the time count of the timer to the predetermined value.

According to another aspect of the present invention, there may be provided a write method including determining, by a storage device, execution order between a first write command and a second write command received and executing the first write command and the second write command according to the determined execution order. Here, the first write command may include first stream identification information having {first stream ID, first epoch ID} and the second write command may include second stream identification information having {second stream ID, second epoch ID}. When the first stream ID and the second stream ID differ from each other, the execution order may be determined without using a result of comparing the first epoch ID and the second epoch ID.

Here, when the first stream ID and the second stream ID are the same, the execution order may be determined by using the result of comparing the first epoch ID and the second epoch ID.

Here, the first write command may further include third stream identification information having {second stream ID, third epoch ID}, and when the first stream ID and the second stream ID differ from each other, the execution order between the first write command and the second write command may depend on priority between the third epoch ID and the second epoch ID.

Here, when the storage device further receives a third write command, the executing may include determining execution order among the first write command, the second write command, and the third write command, and executing the first write command, the second write command, and the third write command according to the determined execution order. The third write command may include fourth stream identification information having {first stream ID, fourth epoch ID}, and when the first stream ID and the second stream ID differ from each other, execution order between the first write command and the third write command depends on priority between the fourth epoch ID and the first epoch ID.

Here, when the first stream ID and the second stream ID differ from each other, the first stream identification information may be generated by a first thread running on a host that transmits the first write command and the second write command to the storage device, and the second stream identification information may be generated by a second thread running on the second.

Here, when the first stream ID and the second stream ID differ from each other, the first epoch ID may be generated by a first epoch counter referenced by the first thread and the second epoch ID may be generated by a second epoch counter referenced by the second thread.

Here, the write method may, prior to the executing, further include executing, by a host that transmits the first write command and the second write command to the storage device, a first thread and a second thread; generating, by the first thread, a first write request having the first stream ID and the first epoch ID and delivering the same to a block layer of the host, and generating, by the second thread, a second write request having the second stream ID and the second epoch ID and delivering the same to the block layer of the host; and generating, by the block layer, the first write command based on the first write request and transmitting the same to the storage device and generating the second write command based on the second write request and transmitting the same to the storage device.

Here, a host that transmits the first write command to the storage device and the storage device may be connected through a plurality of transmission channels and all write commands having specific {stream ID, epoch ID} may be transmitted through only one transmission channel among the plurality of transmission channels.

Here, a host that transmits a write command to the storage device and the storage device may be connected through a plurality of transmission channels, the storage device may include a timeout controller using a timer, and in response to receiving a third write command having {first stream ID, sixth epoch ID} through a first transmission channel, the storage device may run the timer by resetting a time count of the timer to a predetermined value, and in response to receiving a fourth write command having {first stream ID, seventh epoch ID} through a second transmission channel, the storage device may execute the fourth write command only when it is verified that the time count reaches a predetermined reference value.

Here, in response to receiving another write command having {first stream ID, sixth epoch ID} through the first transmission channel after running the timer, the storage device may rerun the timer by resetting the time count of the timer to the predetermined value.

Here, a host that transmits a write command to the storage device and the storage device may be connected through a plurality of transmission channels. In response to receiving a fourth write command having {first stream ID, seventh epoch ID} through a first transmission channel, the storage device may execute a third write command only when the storage device does not receive the third write command having {first stream ID, sixth epoch ID} through a second transmission channel between a first point in time at which the fourth write command is received and a second point in time that is a time before a predetermined timeout time, and the sixth epoch ID may have a higher write priority value than the seventh epoch ID.

Here, a write command generated last in one set of write commands having the above {first stream ID, first epoch ID} may be a barrier-command.

According to another aspect of the present invention, there may be provided a storage device including a controller and a memory. Here, the controller may be configured to determine execution order between a first write command and a second write command received by the storage device and to execute the first write command and the second write command according to the determined execution order, the first write command may include first stream identification information having {first stream ID, first epoch ID}, the second write command may include second stream identification information having {second stream ID, second epoch ID}, and when the first stream ID and the second stream ID differ from each other, the execution order may be determined without using a result of comparing the first epoch ID and the second epoch ID.

Here, when the first stream ID and the second stream ID are the same, the execution order may be determined using the result of comparing the first epoch ID and the second epoch ID.

Here, the first write command may further include third stream identification information having {second stream ID, third epoch ID}, and when the first stream ID and the second stream ID differ from each other, the execution order between the first write command and the second write command may depend on priority between the third epoch ID and the second epoch ID.

Here, when the first stream ID and the second stream ID differ from each other, the first epoch ID may be generated by a first epoch counter referenced by a first thread running on a host that transmits the first write command and the second write command to the storage device, and the second epoch ID may be generated by a second epoch counter referenced by a second thread running on the host.

Here, a host that transmits a write command to the storage device and the storage device may be connected through a plurality of transmission channels, the storage device may include a timeout controller using a timer, and in response to receiving a third write command having {first stream ID, sixth epoch ID} through a first transmission channel, the storage device may run the timer by resetting a time count of the timer to a predetermined value and, in response to receiving a fourth write command having {first stream ID, seventh epoch ID} through a second transmission channel, the storage device may execute the fourth write command only when it is verified that the time count reaches a predetermined reference value.

According to still another aspect of the present invention, there may be provided a storage device including a controller and a memory. Here, the controller may be configured to determine execution order among a first write command, a second write command, and a third write command received and to execute the first write command, the second write command, and the third write command according to the determined execution order. Here, the first write command may include first stream identification information having {first stream ID, first epoch ID} and third stream identification information having {second stream ID, third epoch ID}, the second write command may include second stream identification information having {second stream ID, second epoch ID}, and the third write command may include fourth stream identification information having {first stream ID, fourth epoch ID}. Execution order between the third write command and the second write command may be determined based on priority between the third epoch ID and the second epoch ID and priority between the first epoch ID and the fourth epoch ID.

Here, the first epoch ID and the third epoch ID may have the same priority.

Effect of Invention

According to the present invention, it is possible to provide technology for determining an order guaranteeing unit in a multi-command queue storage.

MODE

Hereinafter, example embodiments of the present invention will be described with reference to the accompanying drawings. However, the present invention is not limited to the example embodiments described herein and may be implemented in various forms. Terms used in this specification are provided to help understanding of the example embodiments and are not intended to limit the scope of the present invention. Also, singular forms used herein include plural forms as well unless the context clearly indicates otherwise.

Figure 1:
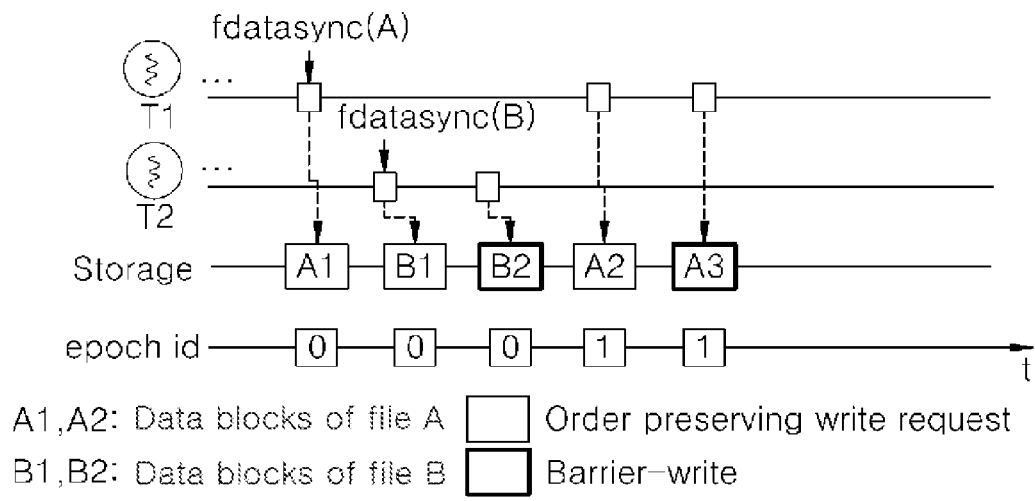
FIG. 1 illustrates input/output (I/O) requests that arrive at an NVMe device over time and an epoch ID of each I/O request when two threads simultaneously call fdatasync( ) for different files.
Figure 2:
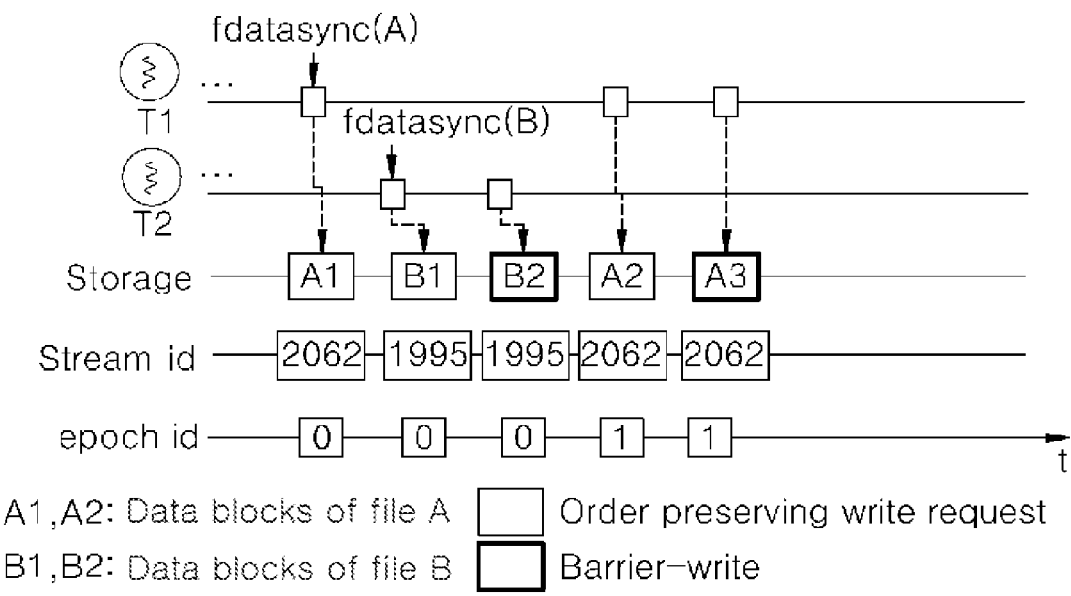
FIG. 2 illustrates I/O arriving at a storage device over time when a stream ID allocation algorithm and an epoch ID allocation algorithm provided according to an aspect of the present invention are applied.
Figure 3:
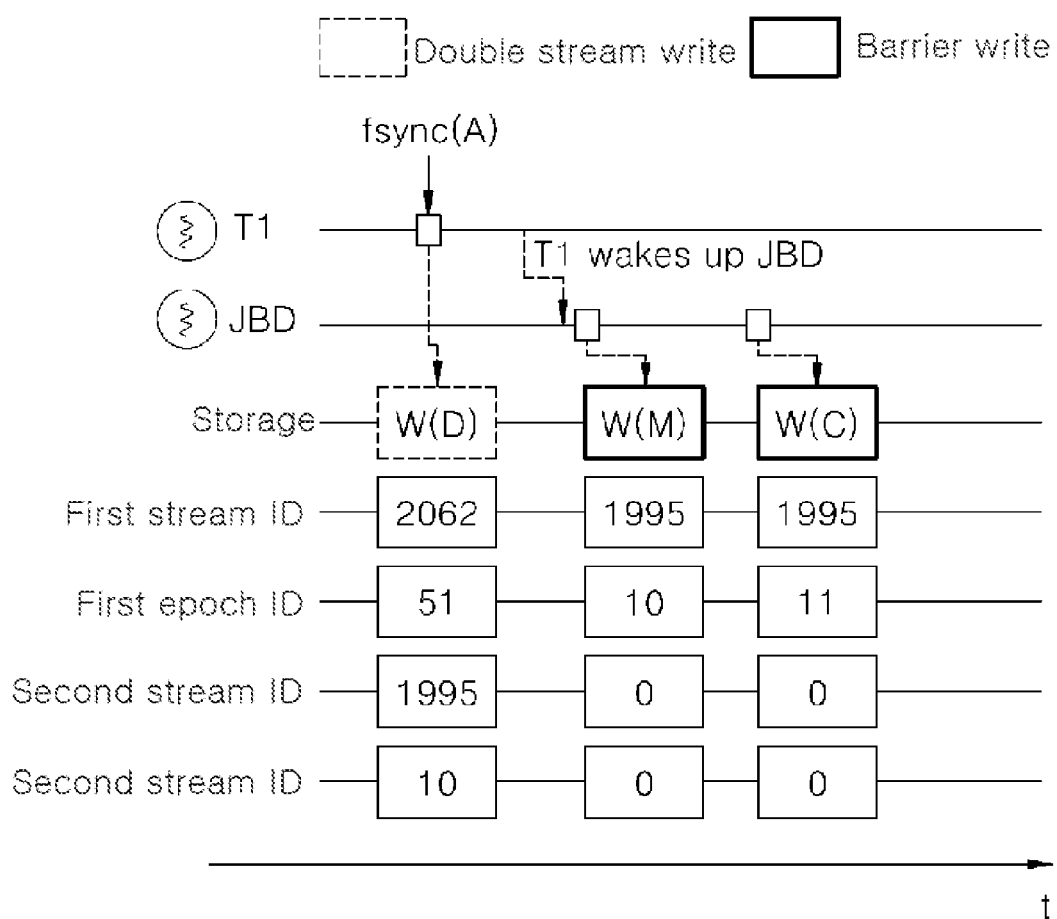
FIG. 3 illustrates I/O arriving at a storage device over time when an application thread calls fsync( ) in a case in which stream ID and epoch ID allocation algorithms of a double stream write provided according to an aspect of the present invention are applied.
Figure 4:
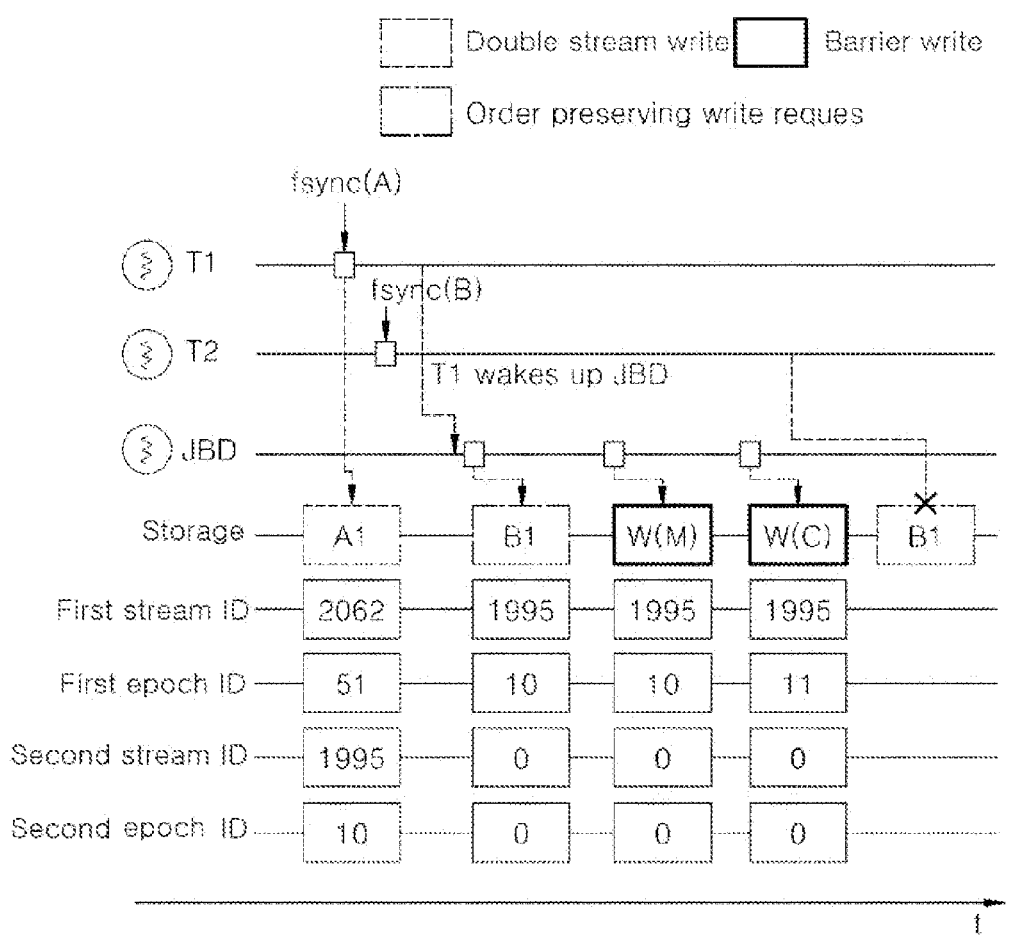
FIG. 4 illustrates I/O arriving at a storage device over time when modifications of multiple files are included in a compound transaction in a case in which a double stream write command provided by the present invention is applied.
Figure 5:
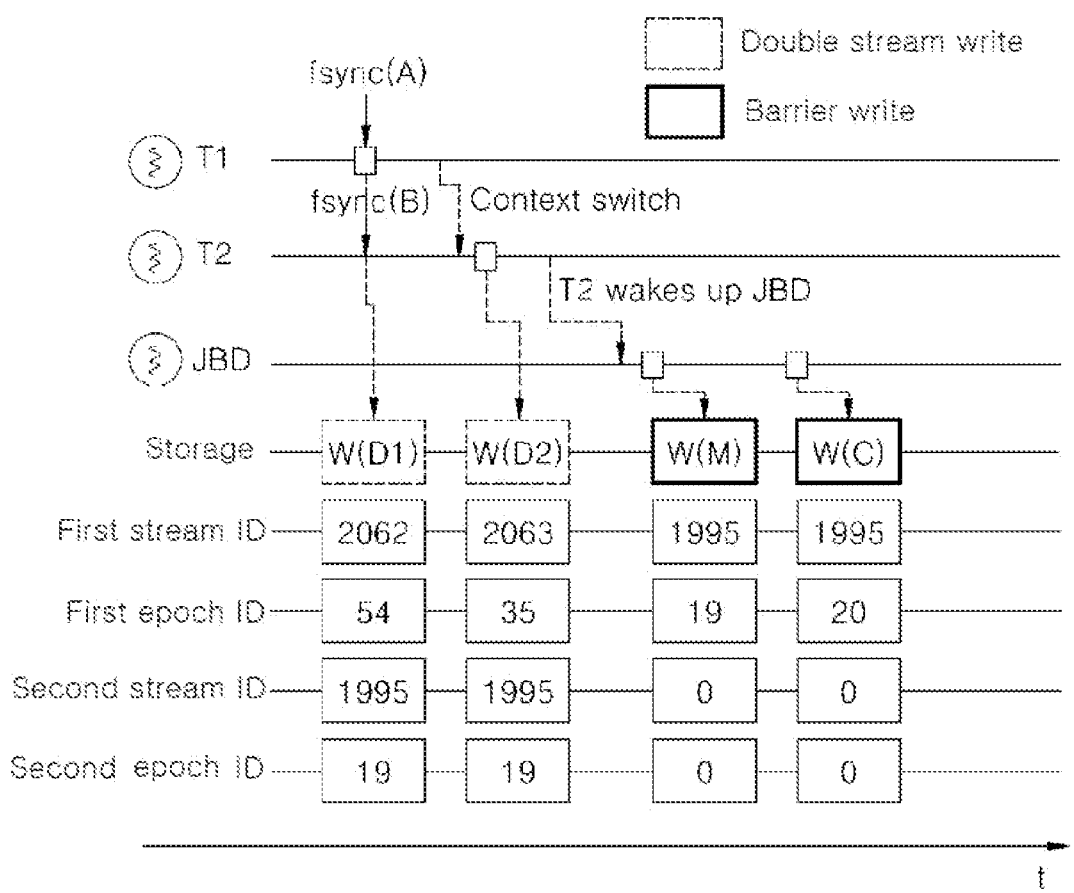
FIG. 5 illustrates I/O arriving at a storage device over time when a plurality of application threads simultaneously calls fsync( ) in a case in which stream ID and epoch ID allocation algorithms of a double stream write provided according to an aspect of the present invention are applied.
Figure 6:
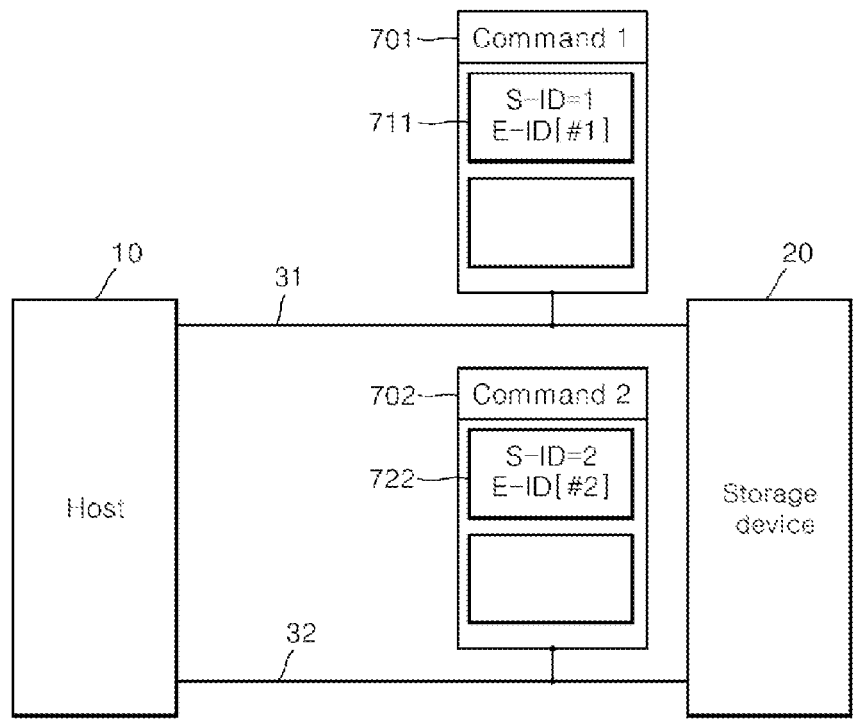
FIG. 6 is a diagram illustrating a method of performing a write command received from a host in a storage device provided according to an example embodiment of the present invention.

FIG. 6 is a diagram illustrating a method of performing a write command received from a host in a storage device provided according to an example embodiment of the present invention.

A storage device 20 may be, for example, a RAID storage device. The storage device 20 may include a RAID controller and a plurality of disks.

The RAID controller may be simply referred to as a controller. The plurality of disks may be referred to as a non-volatile memory. The storage device 20 may further include a volatile memory. The volatile memory and the non-volatile memory may be collectively referred to as a memory.

A host 10 may be a device that transmits various types of commands including a write command and data to the storage device 20.

The host 10 and the storage device 20 may be connected through a plurality of transmission channels including a first transmission channel 31 and a second transmission channel 32.

In an example embodiment, the host 10 and the storage device 20 may be functional modules included in one computing device. In another example embodiment, each of the host 10 and the storage device 20 may be provided to a separate computing device having an independent power supply.

The storage device 10 may be configured to execute an operation of determining execution order between a first write command 701 and a second write command 702 received from the host 10 and executing the first write command 701 and the second write command 702 according to the determined execution order.

The host 10 may generate and manage different threads. Each thread may generate one stream. Here, the "stream" may represent a set of commands generated by a corresponding thread over time. Different streams may be generated by different threads managed by the host 10. Each of different streams may be identified by a parameter called a stream ID.

In an example embodiment of the present invention, a write command may be a single stream write command or may be a double stream write command. Two spaces to store two pieces of stream identification information, respectively, may be provided to the write command. In the case of the single stream write command, stream identification information on a specific stream may be included in a first space of the two spaces and valid information or null information may be included in a second space of the two spaces. In the case of the double stream write command, stream identification information on the specific stream may be included in the first space of the two spaces and stream identification information on a stream different from the specific stream may be included in a second space of the two spaces.

The first write command 701 may include 11-th stream identification information 711 having {first stream ID, first epoch ID}. In the present specification, a stream ID and an epoch ID included in '{ }' represent pair information that is combined with each other.

In the present specification and drawings, 'k-th epoch ID' may be expressed as 'E-ID [#k].'

One piece of stream identification information may be information used to determine execution order of one command received by the storage device 20.

One write command may include one piece of or two or more pieces of stream identification information. The write command may represent a command delivered from the host 10 to the storage device 20 through the transmission channel.

One write command may be associated with only one stream or may be associated with two streams. The write command associated with only one stream is a single stream write command, and the write command associated with two streams is a double stream write command.

For example, one write command may include one piece of stream identification information having a first stream ID. This write command may be referred to as a single stream write command or a single stream write.

Alternatively, one write command may include one piece of stream identification information having a first stream ID and one piece of stream identification information having a second stream ID. This write command may be referred to as a double stream write command or a double stream write.

Each piece of stream identification information belonging to one stream may include one epoch ID.

When the storage device 20 executes different write commands including stream identification information having the same stream ID and the same epoch ID, the storage device 20 may arbitrarily determine execution order thereof.

Within one stream, priority may be present between different epoch IDs. When the storage device 20 executes a first write command having {first stream ID, first epoch ID} and a second write command having {first stream ID, second epoch ID}, the storage device 20 may determine execution order between the first write command and the second write command based on priority between the first epoch ID and the second epoch ID.

In an example embodiment of the present invention, priority may be absent between epoch IDs belonging to different streams. When the storage device 20 executes the first write command having {first stream ID, first epoch ID} and the second write command having {second stream ID, second epoch ID}, the storage device 20 may arbitrarily determine the execution order between the first write command and the second write command.

In an example embodiment of the present invention, the storage device may determine execution order between a first single stream write command associated with only a first stream and a second single stream write command associated with only the first stream based on a result of comparing an epoch ID included in the first single stream write command and an epoch ID included in the second single stream write command.

In an example embodiment of the present invention, the storage device may arbitrarily determine execution order between a first single stream write command associated with only a first stream and a second single stream write command associated with only a second stream. That is, there is no restriction on the execution order between the first single stream write command and the second single stream write command.

In an example embodiment of the present invention, the storage device may determine execution order between a first single stream write command associated with only a first stream and a second double stream write command associated with all of the first stream and a second stream based on a result of comparing an epoch ID associated with the first stream included in the first single stream write command and an epoch ID associated with the first stream included in the second double stream write command. Here, the storage device may determine execution order between a third single stream write command associated with only the second stream and the second double stream write command associated with all of the first stream and the second stream based on a result of comparing an epoch ID associated with the second stream included in the third single stream write command and an epoch ID associated with the second stream included in the second double stream write command. In this manner, priority of execution order may be generated even between a write command associated with the first stream and a write command associated with the second stream.

FIG. 6 illustrates an example in which the first write command 701 includes 11-th stream identification information 711 having {first stream ID, first epoch ID} and the second write command 702 includes 22-nd stream identification information 722 having {second stream ID, second epoch ID}.

If the second write command 702 includes the 22-nd stream identification information 722 having {second stream ID, second epoch ID}, the storage device 20 may determine execution priority between the first write command 701 and the second write command 702 according to a rule of not using a result of values of the first epoch ID and the second epoch ID. Here, the second stream ID has a value different from that of the first stream ID. FIG. 6 illustrates an example in which the first stream ID (S-ID) has a value of 1 and the second stream ID (S-ID) has a value of 2.

For example, although the second write command 702 includes the 22-nd stream identification information 722 having {second stream ID, second epoch ID}, the first epoch ID (E-ID [#1]) has a value of '3,' and the second epoch ID (E-ID [#2]) has a value different from '3,' execution order between the first write command 701 and the second write command 702 is not determined based on the value of the first epoch ID (E-ID [#1]) and the value of the second epoch ID (E-ID [#2]).

Unlike this, that is, unlike the example of FIG. 6, if the second write command 702 includes stream identification information 713 having {first stream ID, third epoch ID}, the storage device 20 may determine the execution priority between the first write command 701 and the second write command 702 according to a rule of comparing values of the first epoch ID and the third epoch ID. That is, since the 11-th stream identification information 711 and the 22-nd stream identification information 722 represent the same stream, the execution priority between the first write command 701 and the second write command 702 may be determined by an epoch ID. It is described with reference to FIGS. 7 and 8.

Figure 7:
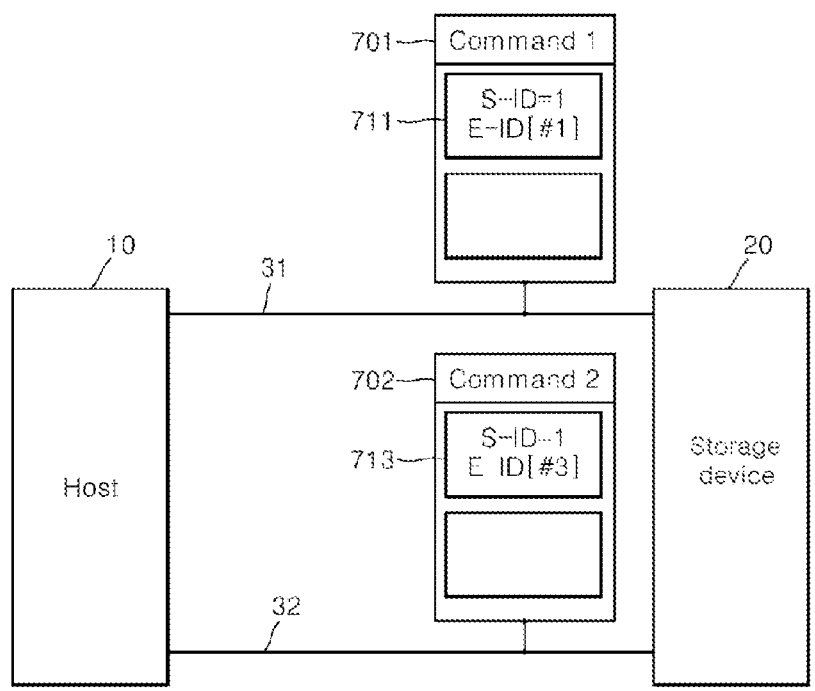
FIGS. 7 and 8 illustrate examples of a second write command including stream identification information having {first stream ID, third epoch ID}.
Figure 8:
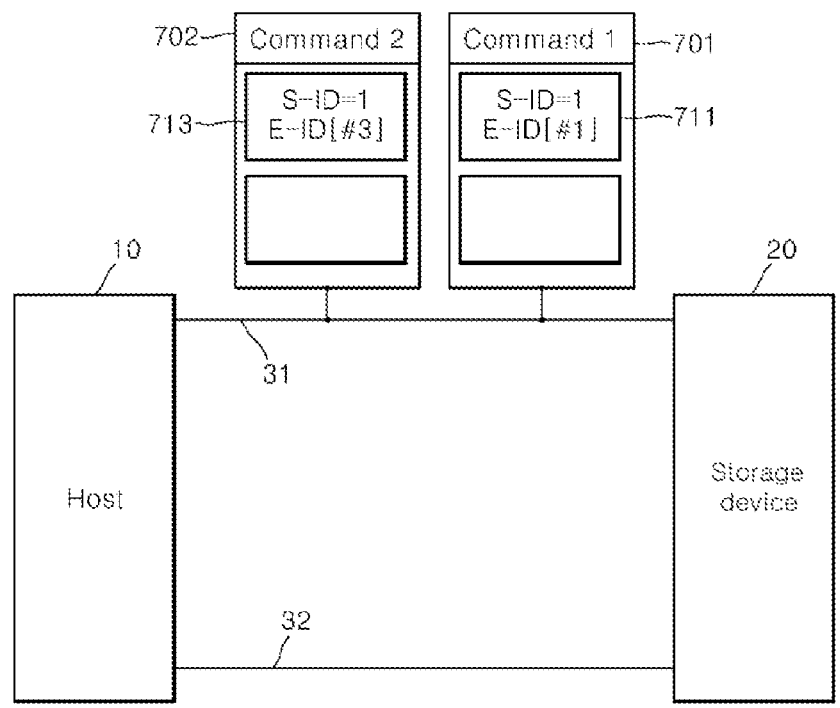

FIGS. 7 and 8 illustrate examples of the second write command 702 including the stream identification information 713 having {first stream ID, third epoch ID}.

For example, if the second write command 702 includes the 13-th stream identification information 713 having {first stream ID, third epoch ID}, the first epoch ID (E-ID [#1]) has a value of '3,' and the third epoch ID (E-ID [#3]) has the same value as '3,' the storage device 20 may readily determine the execution priority between the first write command 701 and the second write command 702.

Unlike this, if the second write command 702 includes the 13-th stream identification information 713 having {first stream ID, third epoch ID}, the first epoch ID (E-ID [#1]) has a value '3,' and the third epoch ID (E-ID [#3]) has a value of '5,' the execution priority between the first write command 701 and the second write command 702 may be determined according to priority between values of the first epoch ID and the third epoch ID.

FIGS. 6 and 7 illustrate examples of transmitting the first write command 701 and the second write command 702 through different transmission channels.

FIG. 8 illustrates an example of transmitting the first write command 701 and the second write command 702 through the same transmission channel.

Figure 9:
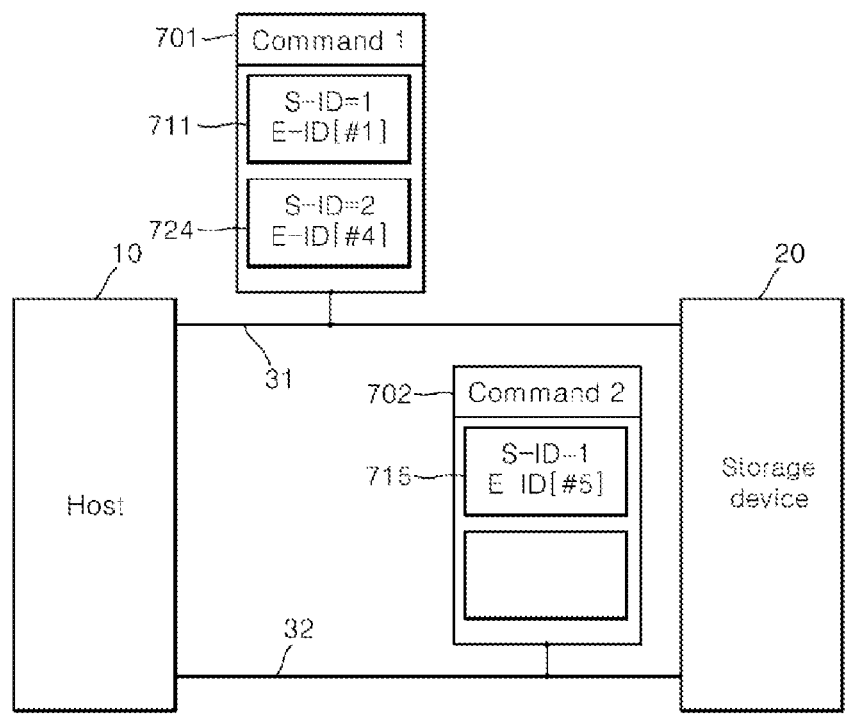
FIG. 9 illustrates an example of describing a write method in a case in which a write command delivered through a transmission channel includes two pieces of stream identification information according to an example embodiment of the present invention.

FIG. 9 illustrates an example of describing a write method in a case in which one write command delivered through a transmission channel includes two pieces of stream identification information according to an example embodiment of the present invention.

The storage device 10 may determine execution priority between the first write command 701 and the second write command 702 received from the host 10 and may execute the first write command 701 and the second write command 702 according to the determined execution priority.

The first write command 701 may include the 11-th stream identification information 711 having {first stream ID, first epoch ID}.

Also, the first write command 701 may further include 24-th stream identification information 724 having {second stream ID, fourth epoch ID}.

Here, the above {first stream ID, first epoch ID} and the above {second stream ID, fourth epoch ID} may be recorded in a portion of an NVMe command structure. That is, in an example embodiment of the present invention, two pieces of stream identification information included in one write command may be recorded in a portion of the NVMe command structure.

A write command including two pieces of stream identification information belonging to two different streams, such as the first write command 701, may be referred to as a double stream write command. If the second write command 702 includes 15-th stream identification information 715 having {first stream ID, fifth epoch ID} and the fifth epoch ID (E-ID [#5]) has higher priority than the first epoch ID (E-ID [#1]), the storage device 20 may execute the first write command 701 later than the second write command 702.

For example, a case in which the fifth epoch ID E-ID [#5] has a value of '1' and the first epoch ID E-ID [#1] has a value of '2' may be assumed. Here, it may be assumed that '1' has higher priority than '2.' In this case, the storage device 20 may execute the first write command 701 later than the second write command 702.

Figure 10:
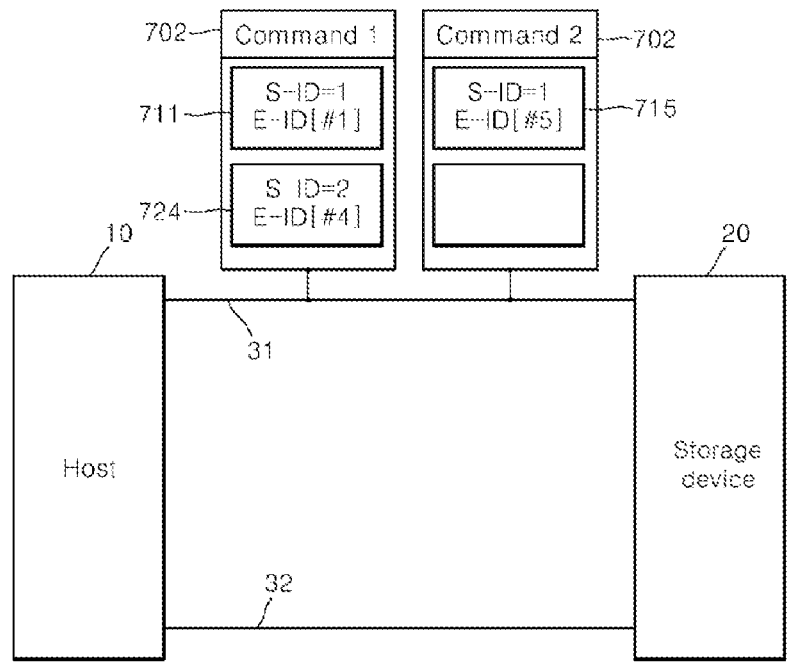
FIG. 10 illustrates an example of describing a write method in a case in which a write command delivered through a transmission channel includes two pieces of stream identification information according to another example embodiment of the present invention.

FIG. 10 illustrates an example of describing a write method in a case in which a write command delivered through a transmission channel includes two pieces of stream identification information according to another example embodiment of the present invention.

FIG. 10 illustrates an example of transmitting the first write command 701 and the second write command 702 through the same first transmission channel 31. In comparison thereto, FIG. 9 illustrates an example of transmitting the first write command 701 and the second write command 702 through different transmission channels 31 and 32. Except for this, the example embodiment of FIG. 10 is the same as the example embodiment of FIG. 9.

Figure 11:
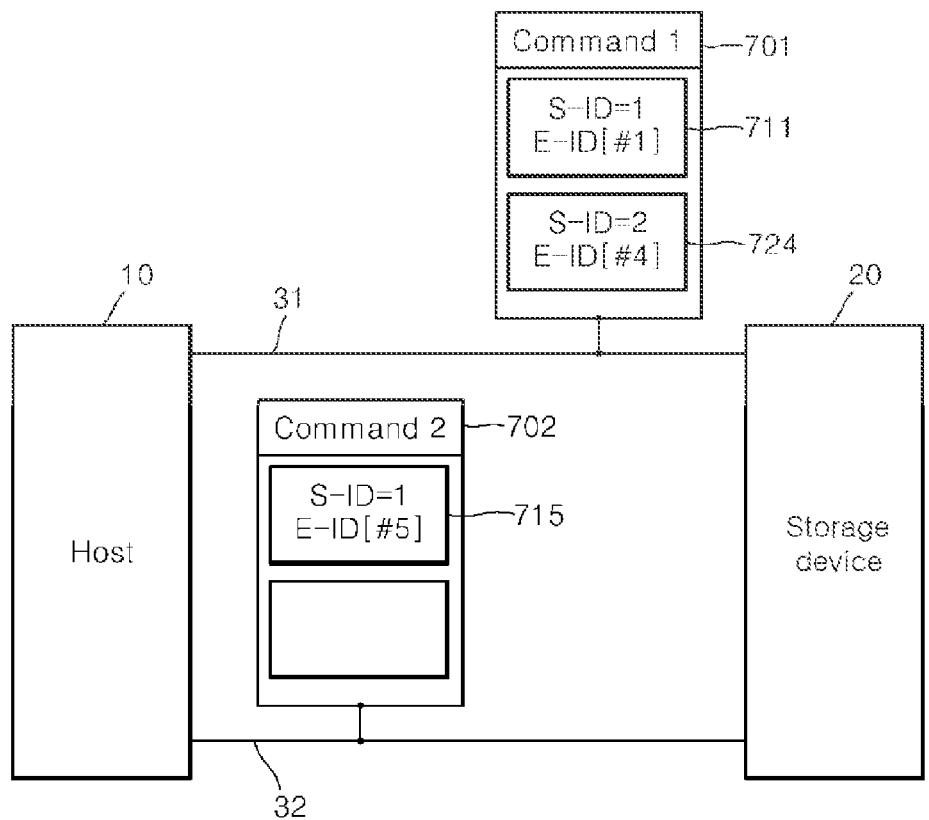
FIG. 11 illustrates an example of describing a write method in a case in which a write command delivered through a transmission channel includes two pieces of stream identification information according to still another example embodiment of the present invention.

FIG. 11 illustrates an example of describing a write method in a case in which a write command delivered through a transmission channel includes two pieces of stream identification information according to still another example embodiment of the present invention.

The example embodiment of FIG. 11 is the same as the example embodiment of FIG. 9 except for some differences. Hereinafter, only some differences are described.

The storage device 20 may verify that the second write command 702 includes the 15-th stream identification information 715 having {first stream ID, fifth epoch ID}. Here, if the fifth epoch ID has lower priority than the first epoch ID, the storage device 20 may execute the first write command 701 before the second write command 702.

Figure 12:
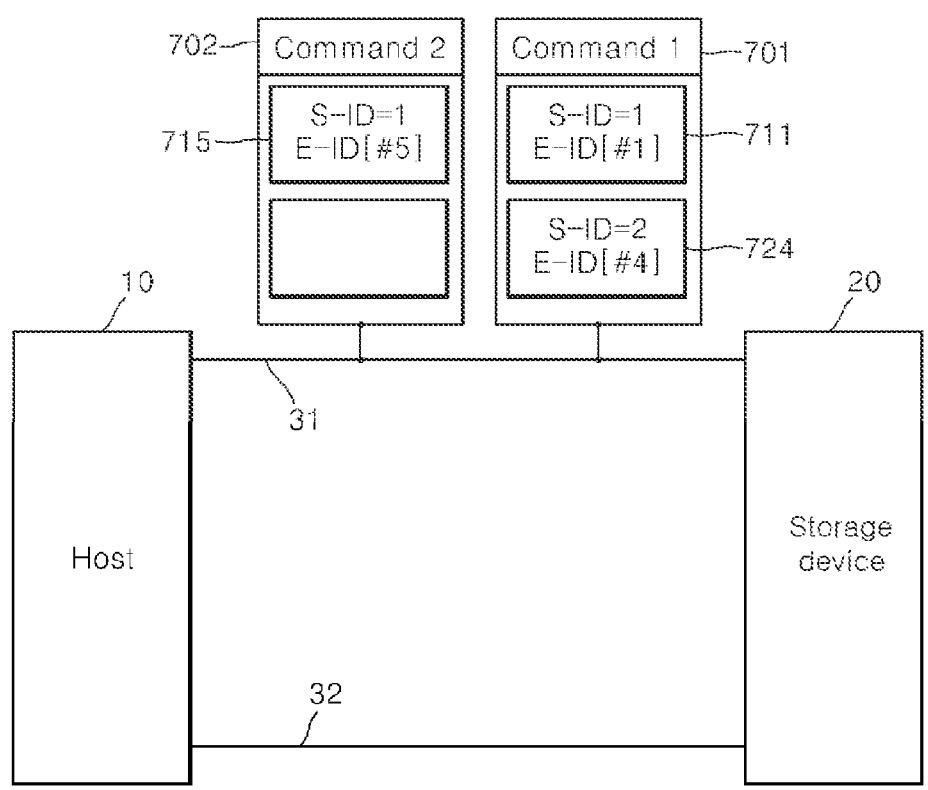
FIG. 12 illustrates an example of describing a write method in a case in which a write command delivered through a transmission channel includes two pieces of stream identification information according to still another example embodiment of the present invention.

FIG. 12 illustrates an example of describing a write method in a case in which a write command delivered through a transmission channel includes two pieces of stream identification information according to still another example embodiment of the present invention.

FIG. 12 illustrates an example of transmitting the first write command 701 and the second write command 702 through the first transmission channel 31. In comparison thereto, FIG. 11 illustrates an example of transmitting the first write command 701 and the second write command 702 through the different transmission channels 31 and 32. Except for this, the example embodiment of FIG. 12 is the same as the example embodiment of FIG. 11.

Figure 13:
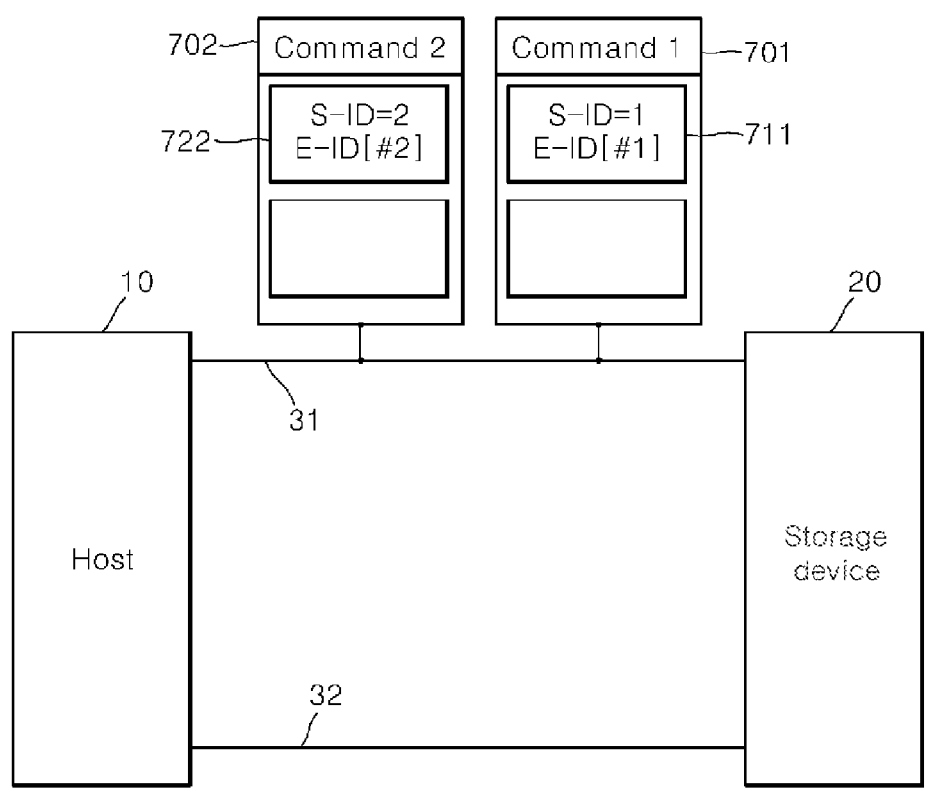
FIG. 13 illustrates an example of delivering write commands belonging to different streams through one transmission channel according to an example embodiment of the present invention.

FIG. 13 illustrates an example of delivering write commands belonging to different streams through one transmission channel according to an example embodiment of the present invention.

FIG. 13 illustrates an example of transmitting the first write command 701 and the second write command 702 through the same first transmission channel 31. In comparison thereto, FIG. 6 illustrates an example of transmitting the first write command 701 and the second write command 702 through the different transmission channels 31 and 32. Except for this, the example embodiment of FIG. 13 is the same as the example embodiment of FIG. 6.

Figure 14:
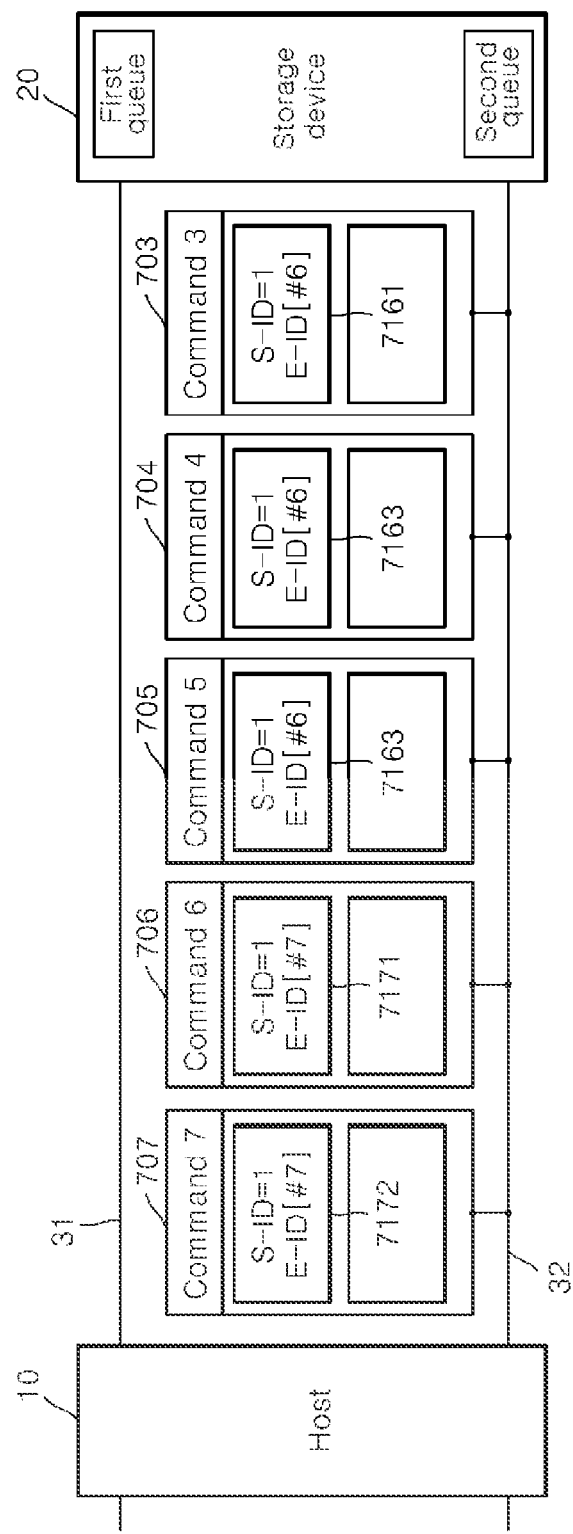
FIG. 14 illustrates a method of transmitting a plurality of write commands having the same epoch ID within one stream according to an example embodiment of the present invention.

FIG. 14 illustrates a method of transmitting a plurality of single stream write commands having the same stream ID and the same epoch ID according to an example embodiment of the present invention.

The example embodiment of FIG. 14 may be used when the host 10 that transmits write commands to the storage device 20 and the storage device 20 are connected through the plurality of transmission channels 31 and 32.

The storage device 20 may provide a plurality of queues corresponding to the number of transmission channels. Commands (write commands) received through a specific transmission channel may be stored in a specific queue corresponding thereto and processed by the storage device 20.

The storage device 20 may generate a first queue that includes commands received through the first transmission channel 31 and may generate a second queue that includes commands received through the second transmission channel 32.

In an example embodiment of the present invention, all write commands having specific {stream ID, epoch ID} may be transmitted through only one transmission channel among the plurality of transmission channels. Such a concept may be referred to as queue-pinning in the present invention.

For example, in FIG. 14, all write commands 703, 704, and 705 having stream identification information, such as {stream ID (S-ID=1) and epoch ID (E-ID [#6])} may be delivered through only one specific transmission channel 32.

Figure 15:
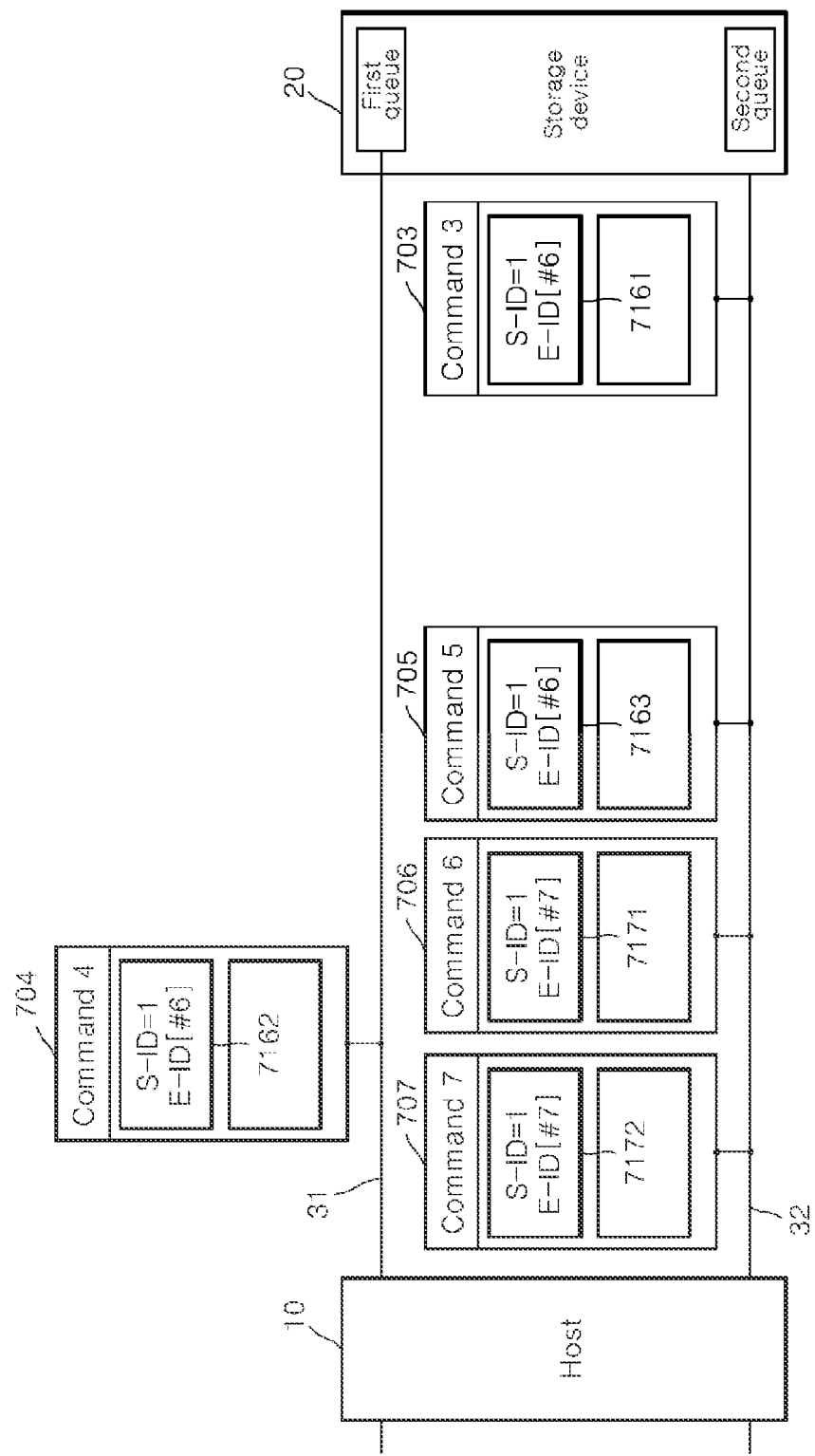
FIG. 15 illustrates a comparative example embodiment compared to the method of FIG. 14.

FIG. 15 illustrates a comparative example embodiment compared to the method of FIG. 14.

In the comparative example embodiment of FIG. 15, write commands having specific {stream ID, epoch ID} are distributed and transmitted on two or more transmission channels among the plurality of transmission channels.

For example, in FIG. 15, the write command 704 among the write commands 703, 704, and 705 having the epoch ID E-ID [#6] among the write commands having the stream ID S-ID of 1 is transmitted through the first transmission channel 31 and other write commands 703 and 705 are transmitted through the second transmission channel 32. Here, the fourth write command 704 having the epoch ID E-ID [#6] has arrived at the storage device 20 later than a sixth write command 706 having epoch ID E-ID [#7]. Here, it may be assumed that the epoch ID E-ID [#6] has higher priority than the epoch ID E-ID [#7].

In the case of using the comparative example embodiment of FIG. 15, the storage device 20 may verify that the fifth write command 705 having the epoch ID E-ID [#6] is followed by the sixth write command 706 having the epoch ID E-ID [#7] in the second queue including commands received through the second transmission channel 32. The storage device 20 may determine that the fifth write command 705 is a last command among the write commands having the epoch ID E-ID [#6]. The storage device 20 may execute the sixth write command 706 having the epoch ID E-ID [#7] before the fourth write command 704 that arrived at the storage device 20 later than the sixth write command 706. Therefore, an error occurs. This is because the epoch ID E-ID [#6] of the fourth write command 704 has higher priority than the epoch ID E-ID [#7] of the sixth write command 706.

In comparison thereto, in the case of using queue-pinning according to an example embodiment of the present invention presented in FIG. 14, when it is verified that the sixth write command 706 that is a first write command having the epoch ID E-ID [#7], the storage device 20 may confirm that a last command having the epoch ID E-ID [#6] is already delivered. Since write commands having the epoch ID E-ID [#6] were being transmitted through the second transmission channel 32, the storage device 20 may know that another write command having the epoch ID E-ID [#6] is not transmitted through another transmission channel 31. Therefore, although the storage device 20 executes the sixth write command 706 at a moment of verifying the sixth write command 706, the error of FIG. 15 does not occur.

In an example embodiment, the 'write command' provided in the aforementioned description related to FIGS. 14 and 15 may represent the aforementioned 'single stream write command.'

Meanwhile, in an example embodiment of the present invention, when one set of write commands having specific {stream ID, epoch ID} are transmitted from the host to the storage device through a specific channel, a last generated write command among the one set of write commands may be a barrier-command having the epoch ID. That is, in response to receiving a barrier-command having a specific stream ID and a specific epoch ID, the storage device 20 may determine that transmission of one set of write commands having the specific stream ID and the specific epoch ID is terminated.

Figure 16:
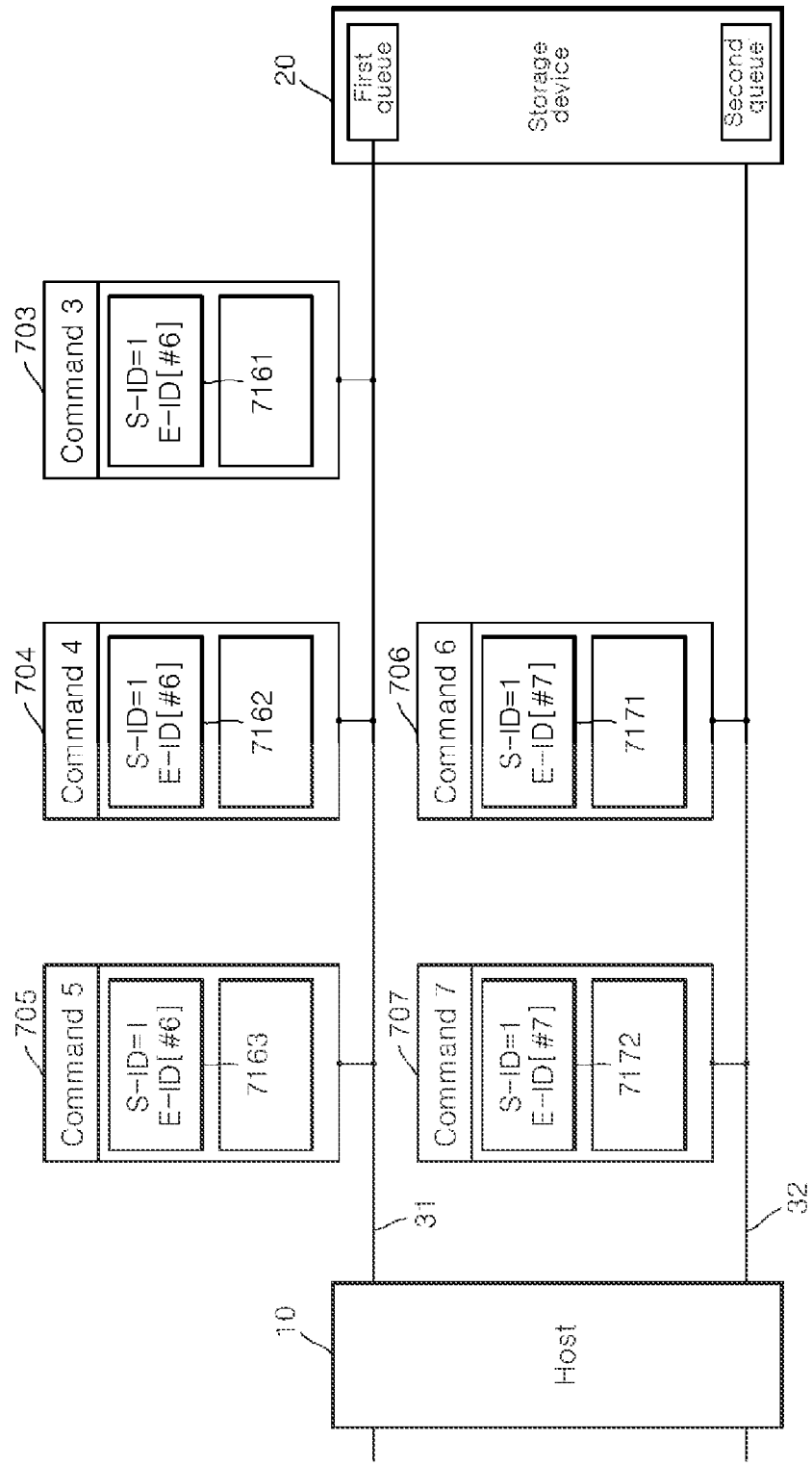
FIG. 16 illustrates an example of describing a method of determining order of executing write commands belonging to one stream according to an example embodiment of the present invention.

FIG. 16 illustrates an example of describing a method of determining order of executing write commands belonging to one stream according to an example embodiment of the present invention.

The example embodiment of FIG. 16 may be usefully used when the host 10 that transmits a write command to the storage device 20 and the storage device 20 are connected through a plurality of transmission channels.

According to the example embodiment of FIG. 16, when the storage device 20 receives the initial write command 706 having {first stream ID, seventh epoch ID} through the specific transmission channel (e.g., transmission channel 32), the storage device 20 may determine whether to execute the initial write command 706 immediately or after waiting for a predetermined period of time.

Here, it is assumed that a write command having {first stream ID, sixth epoch ID} is already received through another transmission channel (e.g., transmission channel 31). Here, the sixth epoch ID has a higher write priority value by 1 than that of the seventh epoch ID.

In the example of FIG. 16, an initial write command having {first stream ID, seventh epoch ID} is provided as the sixth write command 706.

In an example embodiment of the present invention, the storage device 20 may be configured to execute the sixth write command only when the write command 703, 704, or 705 having {first stream ID, sixth epoch ID} is not received through another transmission channel between a first point in time at which the sixth write command 706 is received and a second point in time that is a time before a predetermined timeout time.

Figure 17:
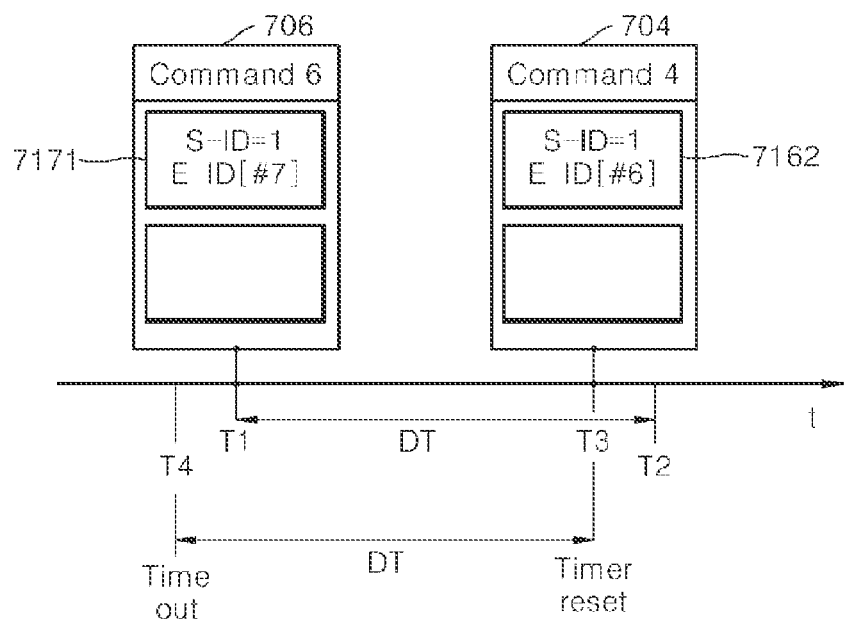
FIG. 17 illustrates one situation that may occur in an example embodiment of the present invention described in FIG. 16.

FIG. 17 illustrates one situation that may occur in an example embodiment of the present invention described in FIG. 16.

Figure 18:
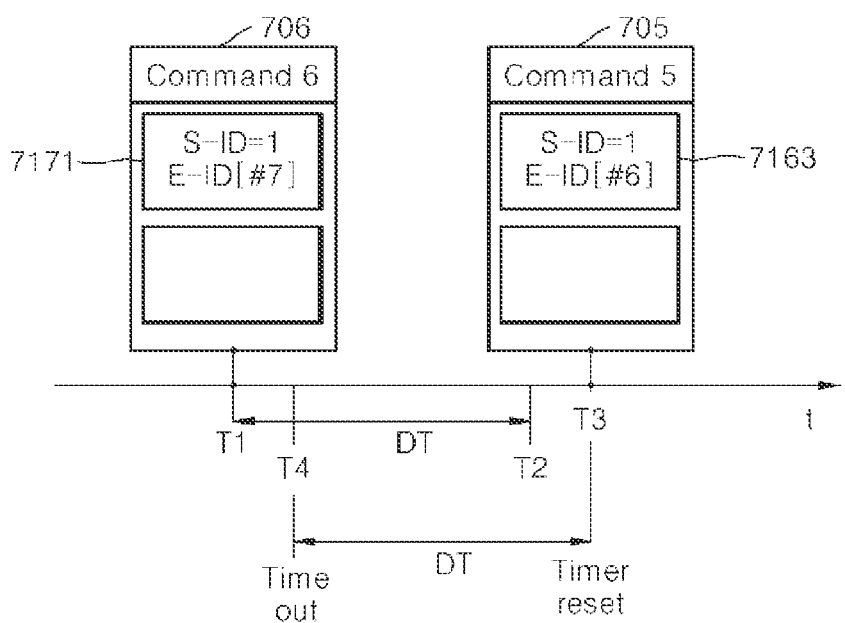
FIG. 18 illustrates another situation that may occur in an example embodiment of the present invention described in FIG. 16.

FIG. 18 illustrates another situation that may occur in an example embodiment of the present invention described in FIG. 16.

In FIGS. 17 and 18, a horizontal axis represents a time and represents a time that occurred first as it goes to the right.

In the example of FIG. 17, the storage device 20 receives the write command 704 having {first stream ID, sixth epoch ID} through the other transmission channel 31 between a first point in time (T1) at which the sixth write command 706 is received and a second point in time (T2) that is a time before a predetermined timeout time (DT). Therefore, although the storage device 20 verities the sixth write command 706, the storage device 20 waits without immediately executing the sixth write command 706.

If the storage device 20 is incapable of knowing that the fourth write command 704 having {first stream ID, sixth epoch ID} is a last write command having the sixth epoch ID, the storage device 20 resets a timer at a third point in time (T3) at which the fourth write command 704 is received and runs the timer. The time is timed out at a fourth point in time (T4) at which the predetermined timeout time (DT) elapses. Since the timeout has not yet occurred at the first point in time (T1), the storage device 20 does not execute the sixth write command 706 at the first point in time (T1). If the timer is timed out at the fourth point in time (T4), the storage device 20 may execute the sixth write command 706.

In the example of FIG. 18, the storage device 20 has not received any write command having {first stream ID, sixth epoch ID} between the first point time (T1) at which the sixth write command 706 is received and the second point in time (T2) that is a time before the predetermined timeout time (DT). Therefore, at the first point in time (T1) at which the sixth write command 706 is verified, the storage device 20 may verify that the timeout has occurred and then immediately execute the sixth write command 706.

In the example of FIG. 18, the storage device 20 receives the fifth write command 705 having {first stream ID, sixth epoch ID} receives at the third point in time (T3) prior to the second point in time (T2). If the storage device 20 is incapable of knowing that the fifth write command 705 is a last write command having the sixth epoch TD, the storage device 20 resets the timer at the third point in time (T3) at which the fifth write command 705 is received and runs the timer. The timer is timed out at the fourth point in time (T4) at which the predetermined timeout time (DT) elapses. Therefore, the storage device 20 may execute the sixth write command 706 at the fourth point in time (T4).

The concept of the present invention described through FIGS. 16 to 18 may be referred to as queue-pinning timeout. The queue-pinning timeout is based on the concept of queue-pinning described with reference to FIG. 14.

The concept of the present invention described with reference to FIGS. 16 to 18 employs expectation that a time interval between two write commands adjacent to each other on a time axis will be smaller than the predetermined timeout time (DT) with respect to write commands that are consecutively generated including (specific stream ID, specific epoch ID).

To implement the aforementioned queue-pinning timeout concept, the storage device 20 may include the timer.

The storage device 20 may perform the following operations.

In operation S510, in response to receiving a write command having {first stream ID, sixth epoch ID} through the first transmission channel 31, the storage device 20 may reset a timer and run the timer.

In operation S520, in the case of receiving the sixth write command 706 having {first stream ID, seventh epoch ID} through the second transmission channel 32, the storage device 20 may execute the sixth write command only when it is verified that the timer is timed out.

Here, in response to receiving another write command having {first stream ID, sixth epoch ID} through the first transmission channel 31 after running the timer, the storage device 20 may reset the timer again and rerun the timer.

Here, the seventh epoch ID may have lower priority than the sixth epoch ID.

The methods presented in FIGS. 17 and 18 may be usefully employed when the storage device 20 is incapable of knowing that a specific write command having {specific stream ID, specific epoch ID} is a last generated write command among a series of write commands having the above {specific stream ID, specific epoch ID}.

Unlike this, as described above, if the last generated write command among a series of write commands having the above {specific stream ID, specific epoch ID} is defined as a barrier-command having the specific epoch ID, the same effect as described above with reference to FIGS. 17 and 18 may be achieved without using the configuration of queue-pinning timeout described in FIGS. 17 and 18.

Figure 19:
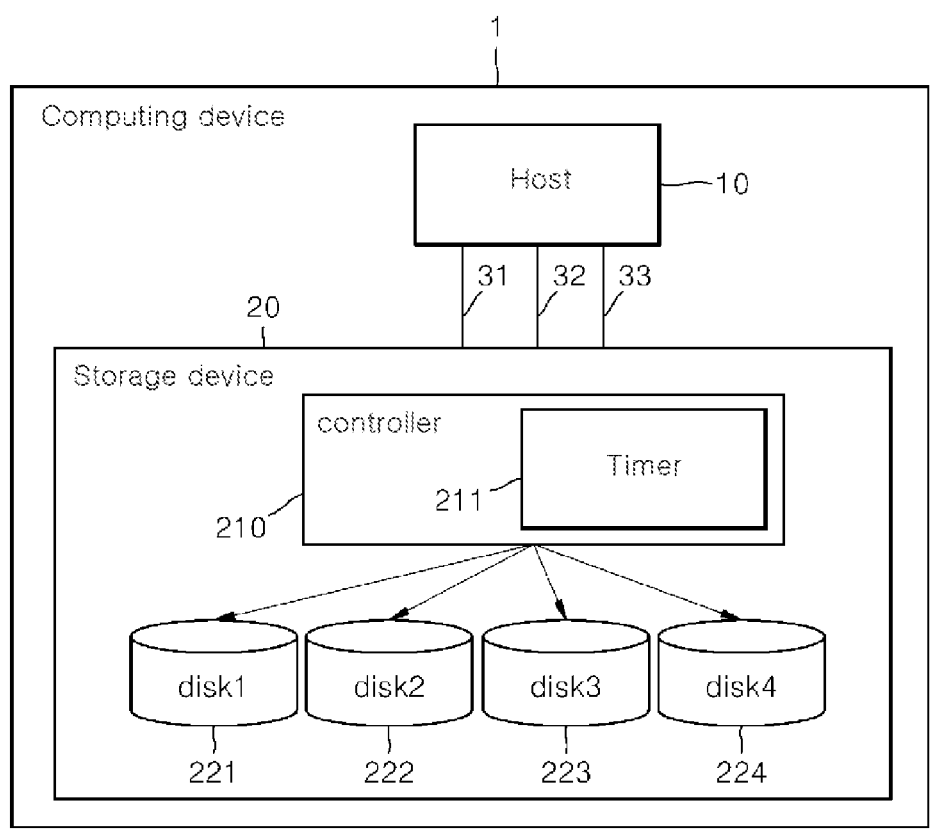
FIG. 19 is a block diagram illustrating a configuration of a computing device including a host and a storage device provided according to an example embodiment of the present invention.

FIG. 19 is a block diagram illustrating a configuration of a computing device including a host and a storage device provided according to an example embodiment of the present invention.

A computing device 1 may include the host 10 and the storage device 20.

The storage device 20 may include a controller 210 and one or a plurality of disks 221, 222, 223, and 224. The controller 210 may include the timer 211.

The storage device 20 may be a RAID storage device. Here, the controller 210 may be a RAID controller.

The host 10 and the storage device 20 may be connected through a plurality of transmission channels (e.g., transmission channels 31, 32, and 33).

Figure 20:
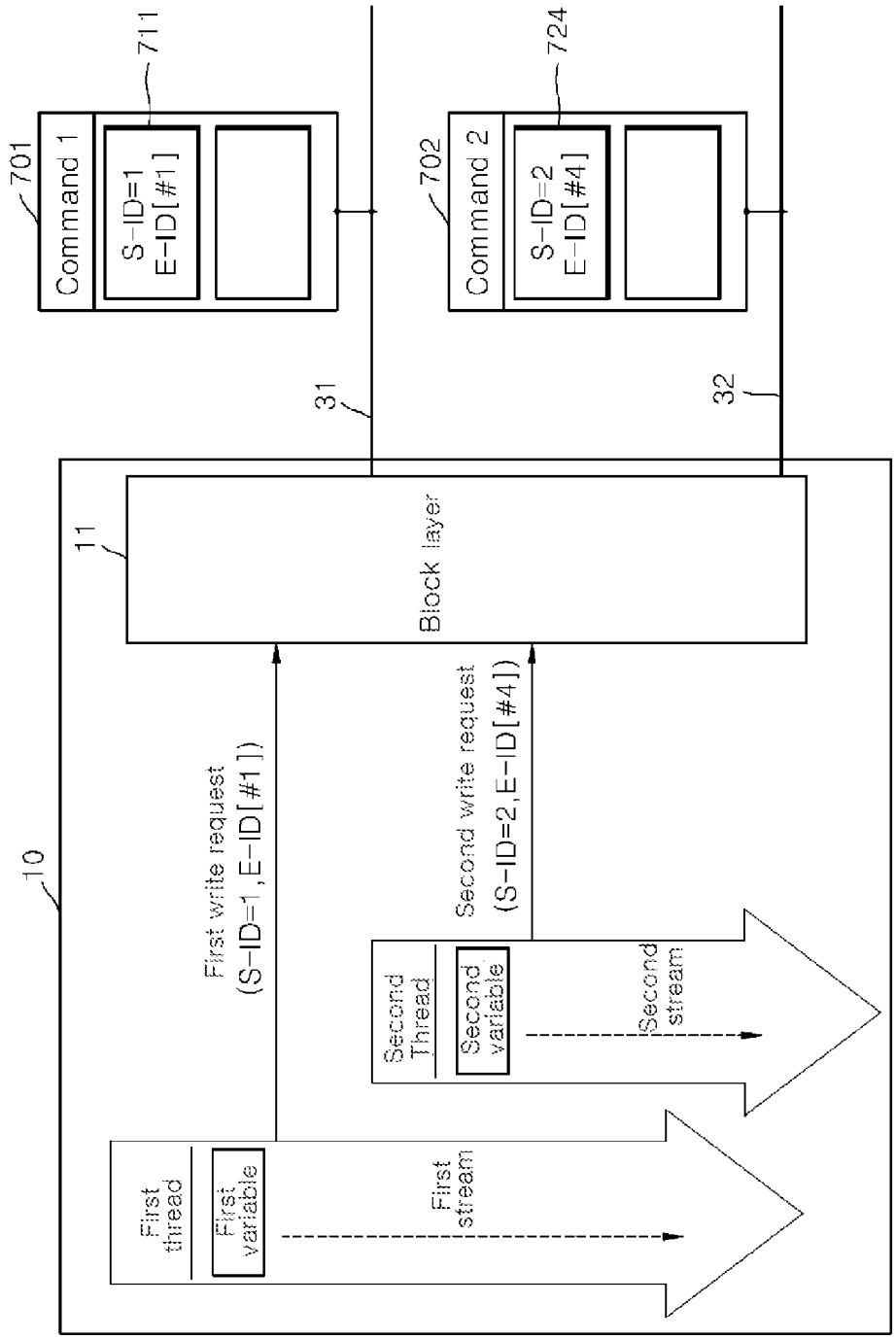
FIGS. 20 and 21 illustrate a process of generating, by a host, a write command according to an example embodiment of the present invention.
Figure 21:
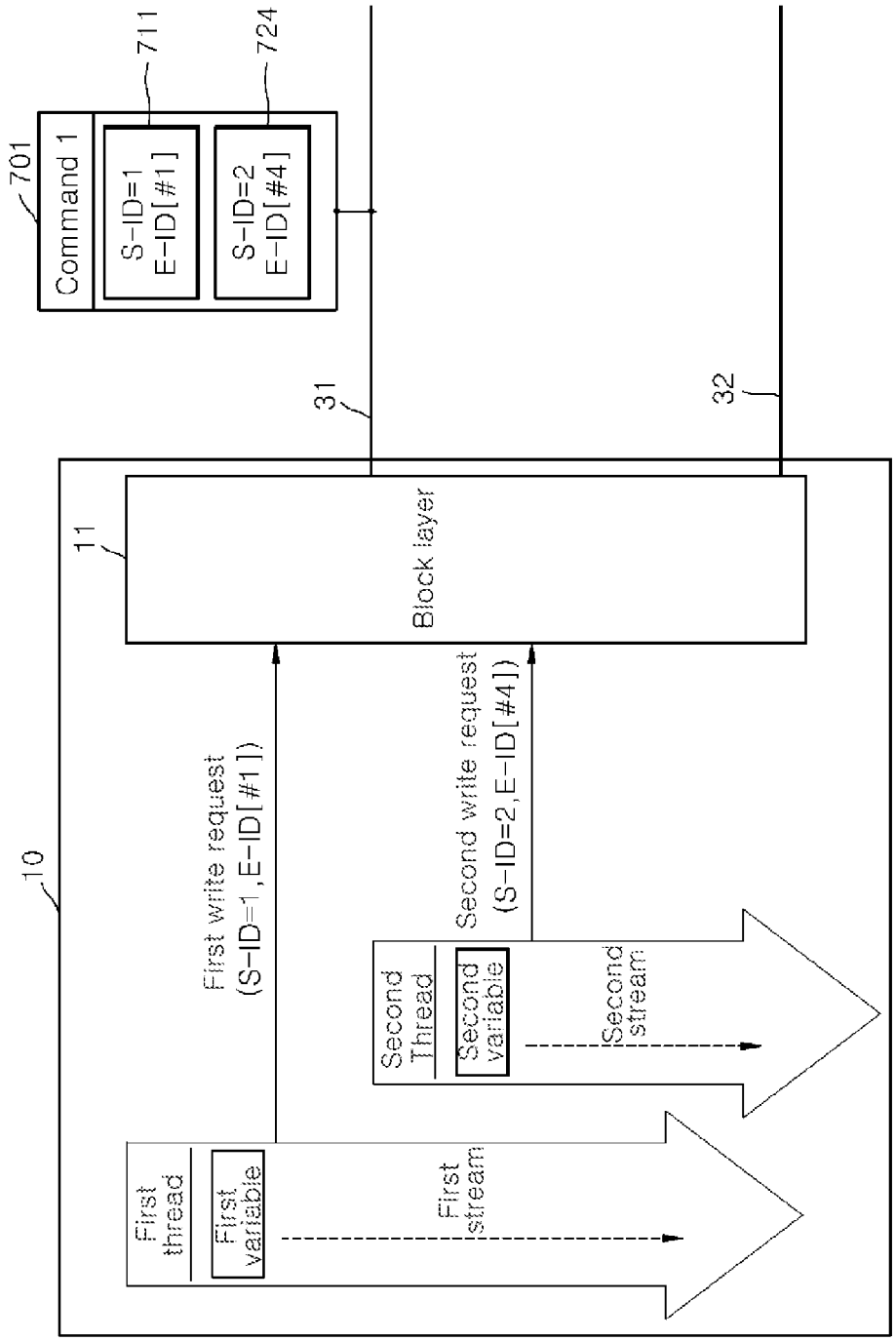

FIGS. 20 and 21 illustrate a process of generating, by a host, a write command according to an example embodiment of the present invention.

The host 10 may generate a first thread and a second thread.

First stream identification information and second stream identification information having different stream IDs may be generated by different threads generated by the host 10. For example, the 11-th stream identification information 711 having the first stream ID may be generated by the first thread generated by the host 10, and the 24-th stream identification information 724 having the second stream ID may be generated by the second thread generated by the host 10.

Here, the first epoch ID included in the 11-th stream identification information 711 may be generated by a first variable used by the first thread and the fourth epoch ID included in the 24-th stream identification information 724 may be generated by a second variable used by the second thread. The first variable and the second variable may be different variables and may be independently managed by the first thread and the second thread, respectively. In the present specification, the first variable and the second variable may also be referred to as a first epoch counter and a second epoch counter, respectively.

The first thread may deliver a first write request that includes a plurality of stream identification information having the first stream ID to a block layer 11. Here, an epoch ID included in each piece of stream identification information may be generated by the first thread using the first variable, and may be, for example, the first epoch ID.

The second thread may deliver a second write request that includes a plurality of stream identification information having the second stream ID to the block layer 11. An epoch ID included in each piece of stream identification information may be generated by the second thread using the second variable, and may be, for example, the fourth epoch ID.

As illustrated in FIG. 20, the block layer 11 may generate the 11-th stream identification information 711 having {first stream ID, first epoch ID} based on the first write request and may generate the first write command 701 that includes the 11-th stream identification information and may transmit the same to the storage device 20. The block layer 11 may generate the 24-th stream identification information 724 having {second stream ID, fourth epoch ID} based on the second write request and may generate the second write command 702 that includes the 24-th stream identification information and may transmit the same to the storage device 20. In the example of FIG. 20, each of the first write command 701 and the second write command 702 is a single stream write command.

Unlike this, as illustrated in FIG. 21, the block layer 11 may generate the first write command 701 that includes the 11-th stream identification information having {first stream ID, first epoch ID} and the 24-th stream identification information having {second stream ID, fourth epoch ID} based on the first write request and the second write request and may transmit the same to the storage device 20. In the example of FIG. 21, the first write command 701 is a double stream write command.

In the present specification, a write command that includes only one piece of stream identification information, such as the second write command 702 of FIG. 20, may be referred to as a single stream write command. A write command that includes two pieces of stream identification information belonging to two different streams, such as the first write command 701 of FIG. 21, may be referred to as a double stream write command.

It will be apparent to those skilled in the art to which the present invention pertains that various alternations and modifications may be easily performed using the aforementioned example embodiments of the present invention without departing from the essential characteristics of the present invention. Contents of each claim of the claims may be combined with other claims without reference relationship within the scope understandable through the present specification.

[Acknowledgement]

The present invention is created with the support of the following research projects.

Project Identification No.: 2018900054
Project No.: 20180005490031001
Department Name: Ministry of Science and ICT
Name of Task Management Professional Institution: Information and Communications Technology Planning and Evaluation Institution
Name of Research Project: SW computing industry source technology development project
Research Project Title: Development of scalable order-guaranteed OS for manycore ultra-capacity memory
Name of Institution to carry out Project: Korea Advanced Institute of Science and Technology (KAIST)
Research Period: 2018.04.01.~2022.12.31

What is claimed is:

1. A write method comprising:
   determining, by a storage device, execution order between a first write command and a second write command received, and executing the first write command and the second write command according to the determined execution order,
   wherein the first write command includes first stream identification information having {first stream ID, first epoch ID},
   the second write command includes second stream identification information having {second stream ID, second epoch ID}, and
   when the first stream ID and the second stream ID differ from each other, the execution order is determined without using a result of comparing the first epoch ID and the second epoch ID,
   wherein the first write command further includes third stream identification information having {second stream ID, third epoch ID}, and
   when the first stream ID and the second stream ID differ from each other, the execution order between the first write command and the second write command depends on priority between the third epoch ID and the second epoch ID.

2. The write method of claim 1, wherein, when the first stream ID and the second stream ID are the same, the execution order is determined using the result of comparing the first epoch ID and the second epoch ID.

3. The write method of claim 1, wherein, when the storage device further receives a third write command, the executing comprises determining execution order among the first write command, the second write command, and the third write command and executing the first write command, the second write command, and the third write command according to the determined execution order,
   the third write command includes fourth stream identification information having {first stream ID, fourth epoch ID}, and
   when the first stream ID and the second stream ID differ from each other, execution order between the first write command and the third write command depends on priority between the fourth epoch ID and the first epoch ID.

4. The write method of claim 1, wherein, when the first stream ID and the second stream ID differ from each other, the first stream identification information is generated by a first thread running on a host that transmits the first write command and the second write command to the storage device, and
   the second stream identification information is generated by a second thread running on the host.

5. The write method of claim 1, prior to the executing, further comprising:
   executing, by a host that transmits the first write command and the second write command to the storage device, a first thread and a second thread;
   generating, by the first thread, a first write request having the first stream ID and the first epoch ID and delivering the same to a block layer of the host, and generating, by the second thread, a second write request having the second stream ID and the second epoch ID and delivering the same to the block layer of the host; and
   generating, by the block layer, the first write command and transmitting the same to the storage device in response to the first write request and generating the second write command and transmitting the same to the storage device in response to the second write request.

6. The write method of claim 1, wherein a host that transmits the first write command to the storage device and the storage device are connected through a plurality of transmission channels and all write commands having specific {stream ID, epoch ID} are transmitted through only one transmission channel among the plurality of transmission channels.

7. The write method of claim 1, wherein a host that transmits a write command to the storage device and the storage device are connected through a plurality of transmission channels, and the storage device includes a timeout controller using a timer, and in response to receiving a third write command having {first stream ID, sixth epoch ID} through a first transmission channel, the storage device is configured to run the timer by resetting a time count of the timer to a predetermined value, and in response to receiving a fourth write command having {first stream ID, seventh epoch ID} through a second transmission channel, the storage device is configured to execute the fourth write command only when it is verified that the time count reaches a predetermined reference value.

8. The write method of claim 7, wherein, in response to receiving another write command having {first stream ID, sixth epoch ID} through the first transmission channel after running the timer, the storage device is configured to rerun the timer by resetting the time count of the timer to the predetermined value.

9. The write method of claim 1, wherein a host that transmits a write command to the storage device and the storage device are connected through a plurality of transmission channels, and in response to receiving a fourth write command having {first stream ID, seventh epoch ID} through a first transmission channel, the storage device is configured to execute a third write command only when the storage device does not receive the third write command having {first stream ID, sixth epoch ID} through a second transmission channel between a first point in time at which the fourth write command is received and a second point in time that is a time before a predetermined timeout time, and the sixth epoch ID has a higher write priority value than the seventh epoch ID.

10. The write method of claim 1, wherein a write command generated last in one set of write commands having the {first stream ID, first epoch ID} is a barrier-command.

11. A storage device comprising:
a controller; and
a memory, wherein the controller is configured to determine execution order between a first write command and a second write command received by the storage device and to execute the first write command and the second write command according to the determined execution order, the first write command includes first stream identification information having {first stream ID, first epoch ID}, the second write command includes second stream identification information having {second stream ID, second epoch ID}, and when the first stream ID and the second stream ID differ from each other, the execution order is determined without using a result of comparing the first epoch ID and the second epoch ID, wherein, when the first stream ID and the second stream ID differ from each other, the first epoch ID is generated by a first epoch counter on a host that transmits the first write command and the second write command to the storage device, and the second epoch ID is generated by a second epoch counter on the host.

12. The storage device of claim 11, wherein, when the first stream ID and the second stream ID are the same, the execution order is determined using the result of comparing the first epoch ID and the second epoch ID.

13. A storage device comprising:
a controller; and
a memory, wherein the controller is configured to determine execution order among a first write command, a second write command, and a third write command received and to execute the first write command, the second write command, and the third write command according to the determined execution order, the first write command includes first stream identification information having {first stream ID, first epoch ID} and third stream identification information having {second stream ID, third epoch ID}, the second write command includes second stream identification information having {second stream ID, second epoch ID}, the third write command includes fourth stream identification information having {first stream ID, fourth epoch ID}, and execution order between the third write command and the second write command is determined based on priority between the third epoch ID and the second epoch ID and priority between the first epoch ID and the fourth epoch ID.

* * * * *